US011824473B2

(12) United States Patent
Suzuki et al.

(10) Patent No.: US 11,824,473 B2
(45) Date of Patent: Nov. 21, 2023

(54) ELECTRIC WORKING MACHINE, AND METHOD FOR SUPPLYING ELECTRIC POWER TO CONTROLLER OF ELECTRIC WORKING MACHINE

(71) Applicant: MAKITA CORPORATION, Anjo (JP)

(72) Inventors: Hitoshi Suzuki, Anjo (JP); Akihiro Nakamoto, Anjo (JP)

(73) Assignee: MAKITA CORPORATION, Anjo (JP)

( * ) Notice: Subject to any disclaimer, the term of this patent is extended or adjusted under 35 U.S.C. 154(b) by 303 days.

(21) Appl. No.: 17/462,820

(22) Filed: Aug. 31, 2021

(65) Prior Publication Data
US 2021/0399668 A1 Dec. 23, 2021

Related U.S. Application Data

(63) Continuation of application No. 16/832,443, filed on Mar. 27, 2020, now Pat. No. 11,133,766.

(30) Foreign Application Priority Data

Apr. 11, 2019 (JP) .................................. 2019-075684
Jun. 5, 2019 (JP) .................................. 2019-105681

(51) Int. Cl.
*H02P 27/06* (2006.01)
*B25F 5/02* (2006.01)
*B25B 21/02* (2006.01)

(52) U.S. Cl.
CPC ................ *H02P 27/06* (2013.01); *B25F 5/02* (2013.01); *B25B 21/02* (2013.01)

(58) Field of Classification Search
CPC . H02P 27/06; B25F 5/02; B25B 21/02; G05B 11/01

(Continued)

(56) References Cited

U.S. PATENT DOCUMENTS 6,237,698 B1   5/2001   Carrier et al.
6,286,699 B1   9/2001   Sudo
(Continued)

FOREIGN PATENT DOCUMENTS

CN   108437835 A   8/2018
JP   2006-341325 A   12/2006
(Continued)

OTHER PUBLICATIONS

Jul. 23, 2020 Extended Search Report issued in European Patent Application No. 20165437.3.
(Continued)

*Primary Examiner* — David Luo
(74) *Attorney, Agent, or Firm* — Oliff PLC

(57) ABSTRACT

An electric working machine in one aspect of the present disclosure includes a driving device, a controller, a control power source, and an operation state determiner. The control power source includes a first converter and a second converter. The control power source transitions to a first conversion state when the operation state determiner determines that the controller is in a control operation state. The control power source in the first conversion state supplies a first control current to the controller. The control power source transitions to a second conversion state when the operation state determiner determines that the controller is in a low power operation state. The control power source in the second conversion state (i) stops operation of the first converter, and (ii) supplies a second control current to the controller.

20 Claims, 12 Drawing Sheets

(58) Field of Classification Search
USPC .................................................. 318/139, 3
See application file for complete search history.

(56) References Cited

U.S. PATENT DOCUMENTS

| | | |
|---|---|---|
| 7,133,601 B2 | 11/2006 | Phillips et al. |
| 7,973,499 B2 * | 7/2011 | Yoshioka ............... B60L 3/003 |
| | | 318/434 |
| 2003/0137285 A1 | 7/2003 | Tamai et al. |
| 2004/0179829 A1 | 9/2004 | Phillips et al. |
| 2006/0220605 A1 | 10/2006 | Funabashi et al. |
| 2006/0222930 A1 | 10/2006 | Aradachi et al. |
| 2017/0027537 A1 | 2/2017 | Zhang et al. |

FOREIGN PATENT DOCUMENTS

| | | | |
|---|---|---|---|
| JP | 2014-200161 A | 10/2014 | |
| JP | 5803115 B2 | 11/2015 | |

OTHER PUBLICATIONS

Jun. 2, 2021 Notice of Allowance issued in U.S. Appl. No. 191142.
Jan. 10, 2023 Office Action issued in Japanese Patent Application No. 2019-105681.

* cited by examiner

ELECTRIC WORKING MACHINE, AND METHOD FOR SUPPLYING ELECTRIC POWER TO CONTROLLER OF ELECTRIC WORKING MACHINE

CROSS-REFERENCE TO RELATED APPLICATIONS

This is a Continuation Application of U.S. patent application Ser. No. 16/832,443 filed Mar. 27, 2020, which claims the benefit of Japanese Patent Applications No. 2019-075684 filed on Apr. 11, 2019 and No. 2019-105681 filed on Jun. 5, 2019 with the Japan Patent Office, the entire disclosures of which are incorporated herein by reference.

BACKGROUND

The present disclosure relates to an electric working machine.

Japanese Unexamined Patent Application Publication No. 2006-341325 discloses an electric working machine provided with a driving device that is driven by power supply from a battery (i.e. a power source). The electric working machine includes a controller that controls the driving device, and a control power source that supplies an electric power to the controller based on an electric power from the battery. Examples of the driving device includes a motor, a heater, etc. The electric working machine interrupts power supply from the control power source in order to suppress overdischarge of the battery when the electric working machine is not used. This allows the electric working machine to reduce power consumption in the controller or the control power source to zero (0).

In case that power supply from the control power source is interrupted, events as below may occur: (1) communications between the electric working machine and external devices becomes unavailable while the electric power is interrupted, and (2) a time lag occurs between re-manipulation of a trigger of the electric working machine and restart of the motor of the electric working machine so that feeling of use decreases.

In contrast, it is conceivable to transition the controller to a low power operation state (so-called sleep mode), instead of interrupting power supply from the control power source, while the electric working machine is not used. For example, it is conceivable to use a controller configured such that its operation state is transitioned to a control operation state or a low power operation state. In the control operation state, the driving device is controlled when the user manipulates the electric working machine. In the low power operation state, power consumption in the controller is reduced. In other words, this controller is configured to transition to the low power operation state in order to suppress overdischarge of the battery.

SUMMARY

In the aforementioned electric working machine, although power consumption in the controller can be reduced by transitioning the operation state of the controller to the low power operation state, there is a possibility that power consumption in the control power source cannot be reduced since the control power source performs a power conversion operation.

For example, in case that a linear regulator is used as the control power source, when an output voltage (power-supply voltage) of the battery increases, loss Ls (=(Vin−Vout)×Io) in the linear regulator increases. Vin represents an input voltage (in other words, output voltage of the battery) to the linear regulator, Vout represents an output voltage from the regulator, and Io represents an output current of the linear regulator. In other words, at the time of normal operation, as the power-supply voltage increases, power consumption due to the loss Ls occurs in the control power source.

In order to suppress increase in power consumption due to increase in power-supply voltage, a switching regulator such as a DC-DC converter may be used as the control power source. However, the switching regulator as such generally consumes a large operation current. Thus, even if the controller transitions to the sleep mode, it is difficult to reduce power consumption as a whole due to the large operation current of the switching regulator.

In other words, even if the controller transitions to the sleep mode while the electric working machine is not used, and power consumption in the controller can be reduced, electric power is consumed in the control power source, so that electric power of the battery (power source) is reduced.

In one aspect of the present disclosure, it is desirable that power consumption in an electric working machine can be reduced when the electric working machine is not used.

An electric working machine in one aspect of the present disclosure includes a driving device, a controller, an operation state determiner, a control power source, and/or an operation state determiner.

The driving device is driven with power-supply power from the power source.

The controller switches an operation state of the controller to one of multiple operation states. The multiple operation states include a control operation state and a low power operation state. The controller in the control operation state controls the driving device. The controller in the low power operation state consumes electric power smaller than power consumption of the controller in the control operation state.

The operation state determiner determines the operation state of the controller.

The control power source includes a first converter and a second converter. The first converter outputs a first control current based on the power-supply power. The first control current has a maximum value corresponding to a maximum consumption current value of the controller in the control operation state.

The second converter outputs a second control current based on the power-supply power. The second control current has a maximum value (i) smaller than the maximum value of the first control current and (ii) corresponding to a maximum consumption current value of the controller in the low power operation state.

Further, the control power source transitions to a first conversion state in response to the operation state determiner determining that the controller is in the control operation state. The control power source in the first conversion state supplies the first control current to the controller. The control power source transitions to the second conversion state in response to the operation state determiner determining that the controller is in the low power operation state. The control power source in the second conversion state (i) stops operation of the first converter, and (ii) supplies the second control current to the controller.

The electric working machine can suppress power consumption in the first converter in order to stop operation of the first converter when the controller is in the low power operation state. Therefore, in case that the operation state of the controller is transitioned from the control operation state to the low power operation state when the electric working machine is not used, the electric working machine can reduce not only power consumption in the controller but also power consumption in the first converter. This allows the electric working machine to reduce power consumption when the electric working machine is not used.

The control power source may transition to the first conversion state in response to a user manipulating the electric working machine.

In other words, in case that the user manipulates the electric working machine when the control power source is in the second conversion state, the control power source transitions from the second conversion state to the first conversion state. As a result, the first control current is supplied to the controller at least by the first converter. This allows the controller to receive supply of the first control current required in the control operation state, and control the driving device. An example manipulation of the electric working machine by the user includes manipulation of a trigger switch by the user, etc.

The first converter may include a first outputter. The electric working machine may include a first reverse flow suppressor. The first reverse flow suppressor suppresses inflow of reverse current to the first outputter. The electric working machine can suppress inflow of the second control current to the first outputter. The first reverse flow suppressor may include a switching element such as a diode or FET coupled in series to the first outputter.

The control power source may include a first current path and a second current path. The first current path may be a part of a current path from the power source to the controller. The first converter may be provided in the first current path. The second current path may be coupled in parallel to the first current path. The second converter may be provided in the second current path.

The control power source in the first conversion state may supply the first control current to the controller via the first current path. The control power source in the second conversion state may supply the second control current to the controller via the second current path.

The electric working machine can suppress power consumption in the first converter when the controller is in the low power operation state, since the control power source transitions to the second conversion state, and stops power supply using the first converter. Thus, in case that the controller transitions from the control operation state to the low power operation state when the electric working machine is not used, the electric working machine can reduce not only power consumption in the controller but also power consumption in the first converter. As a result, the electric working machine can reduce power consumption when the electric working machine is not used.

The second converter may include a second outputter. The electric working machine may include a second reverse flow suppressor. The second reverse flow suppressor may be provided in the second current path between the second converter and the controller. The second reverse flow suppressor may suppress inflow of reverse current to the second outputter.

The electric working machine as such can keep the first control current from flowing toward the second outputter as a reverse current. The second reverse flow suppressor may include a switching element such as a diode or FET coupled in series to the second converter.

The power source may output a power-supply voltage. The first converter may output a first control voltage based on the power-supply voltage. The first control voltage may be lower than the power-supply voltage. The second converter may output a second control voltage based on the power-supply voltage. The first control voltage may be approximately equal to the second control voltage. The electric working machine can keep applied voltage to the controller constant regardless of whether the first converter or the second converter is used. Thus, the electric working machine can suppress malfunction due to fluctuation in the applied voltage at the time of switching between the first converter and the second converter.

The operation state determiner may receive a first state notification signal and a second state notification signal. The operation state determiner may determine that the operation state of the controller is the control operation state in response to receipt of the first state notification signal. The operation state determiner may determine that the operation state of the controller is the low power operation state in response to receipt of the second state notification signal. The first state notification signal indicates that the operation state of the controller is the control operation state. The second state notification signal indicates that the operation state of the controller is the low power operation state. In the electric working machine, the operation state determiner can determine the operation state of the controller based on the first state notification signal and the second state notification signal.

The control power source may include a third current path, a bypass current path, and a common current path. The third current path may be a part of the current path from the power source to the controller. The first converter may be provided in the third current path. The bypass current path may be coupled in parallel to the third current path. The common current path may have a first end coupled to the third current path and the bypass current path. The second converter may be provided in the common current path.

The power source may output a power-supply voltage.

The first converter may convert the power-supply voltage to the first control voltage. The first control voltage may be lower than the power-supply voltage.

The second converter may convert the power-supply voltage or the first control voltage to the second control voltage. The second control voltage may be lower than the first control voltage.

The control power source in the first conversion state may operate the first converter and the second converter so that the second converter converts the first control voltage to the second control voltage. The control power source in the first conversion state may supply the second control voltage to the controller. The control power source in the first conversion state may operate the second converter so that the second converter converts the power-supply voltage to the second control voltage.

The electric working machine can suppress power consumption in the first converter when the controller is in the low power operation state, since the control power source transitions to the second conversion state and stops operation of the first converter. Therefore, in case that the controller transitions from the control operation state to the low power operation state when the electric working machine is not used, the electric working machine can reduce not only power consumption in the controller but also power consumption in the first converter. This allows the electric working machine to reduce power consumption when the electric working machine is not used.

The bypass current path may receive a bypass current. The operation state determiner may determine whether a value of the bypass current flowing through the bypass current path is larger than a predefined operation reference value. Further, the operation state determiner may determine that the controller is in the control operation state in response to the value of the bypass current being larger than the operation reference value. Further, the operation state determiner may determine that the controller is in the low power operation state in response to the value of the bypass current being equal to or smaller than the operation reference value. The operation state determiner can determine the operation state of the controller based on a result of comparison between the bypass current and the operation reference value.

The operation state determiner may receive the first state notification signal and the second state notification signal. The operation state determiner may determine that the controller is in the control operation state in response the value of the bypass current being larger than the operation reference value or in response to receipt of the first state notification signal. The operation state determiner may determine that the controller is in the low power operation state (i) in response to the value of the bypass current being equal to or smaller than the operation reference value and (ii) in response to receipt of the second state notification signal. The first state notification signal indicates that the operation state of the controller is the control operation state. The second state notification signal indicates that the operation state of the controller is the low power operation state. The operation state determiner can determine the operation state of the controller based on the first state notification signal and the second state notification signal, in addition to the result of comparison between the bypass current and the operation reference value.

The power source may include a first voltage outputter and a second voltage outputter. The first converter may be coupled to the first voltage outputter. The second converter may be couple to the second voltage outputter.

In other words, the power source can change a maximum output voltage by employing different configurations for an output voltage of the first voltage outputter and an output voltage of the second voltage outputter. This allows the electric working machine to operate an increased output based on the increased power-supply voltage.

The electric working machine as such stops operation of the first converter when the controller is in the low power operation state. Thus, the electric working machine can suppress power consumption in the first converter, and can reduce power consumption when the electric working machine is not used.

The first voltage outputter may output a first output voltage. The second voltage outputter may output a second output voltage. The first output voltage may be higher than the second output voltage. As a result, electric energy that can be outputted from the first converter is larger than electric energy that can be outputted from the second converter. Thus, the first converter, as compared to the second converter, can supply sufficient electric power to the controller. This can reduce voltage change for voltage conversion in the second converter, and reduce power loss due to voltage conversion as compared to a case of large voltage change.

The power source may further include a third voltage outputter. The third voltage outputter may output a third output voltage. The second output voltage may be lower than the third output voltage. In other words, the second voltage outputter outputs a voltage lower than those of the first voltage outputter and the third voltage outputter. This can reduce voltage change for voltage conversion in the second converter, and reduce power loss due to power conversion as compared to a case of large voltage change.

Another aspect of the present disclosure provides a method for supplying electric power to a controller in an electric working machine. The method includes supplying a first control current from a first converter to the controller in response to the controller being in a control operation state, and/or supplying a second control current from a second converter to the controller in response to the controller being in a low power operation state. The first converter is configured to output the first control current based on power-supply power of the electric working machine. The first control current has a maximum value corresponding to a maximum consumption current value of the controller in the control operation state. The second converter is configured to output the second control current based on the power-supply power. The second control current has a maximum value (i) smaller than the maximum value of the first control current and (ii) corresponding to a maximum consumption current value of the controller in the low power operation state.

BRIEF DESCRIPTION OF THE DRAWINGS

Exemplary embodiments of the present disclosure will be described hereinafter with reference to the accompanying drawings, in which.

DETAILED DESCRIPTION OF EXEMPLARY EMBODIMENTS

1. First Embodiment

[1-1. Overall Configuration]

Figure 1:
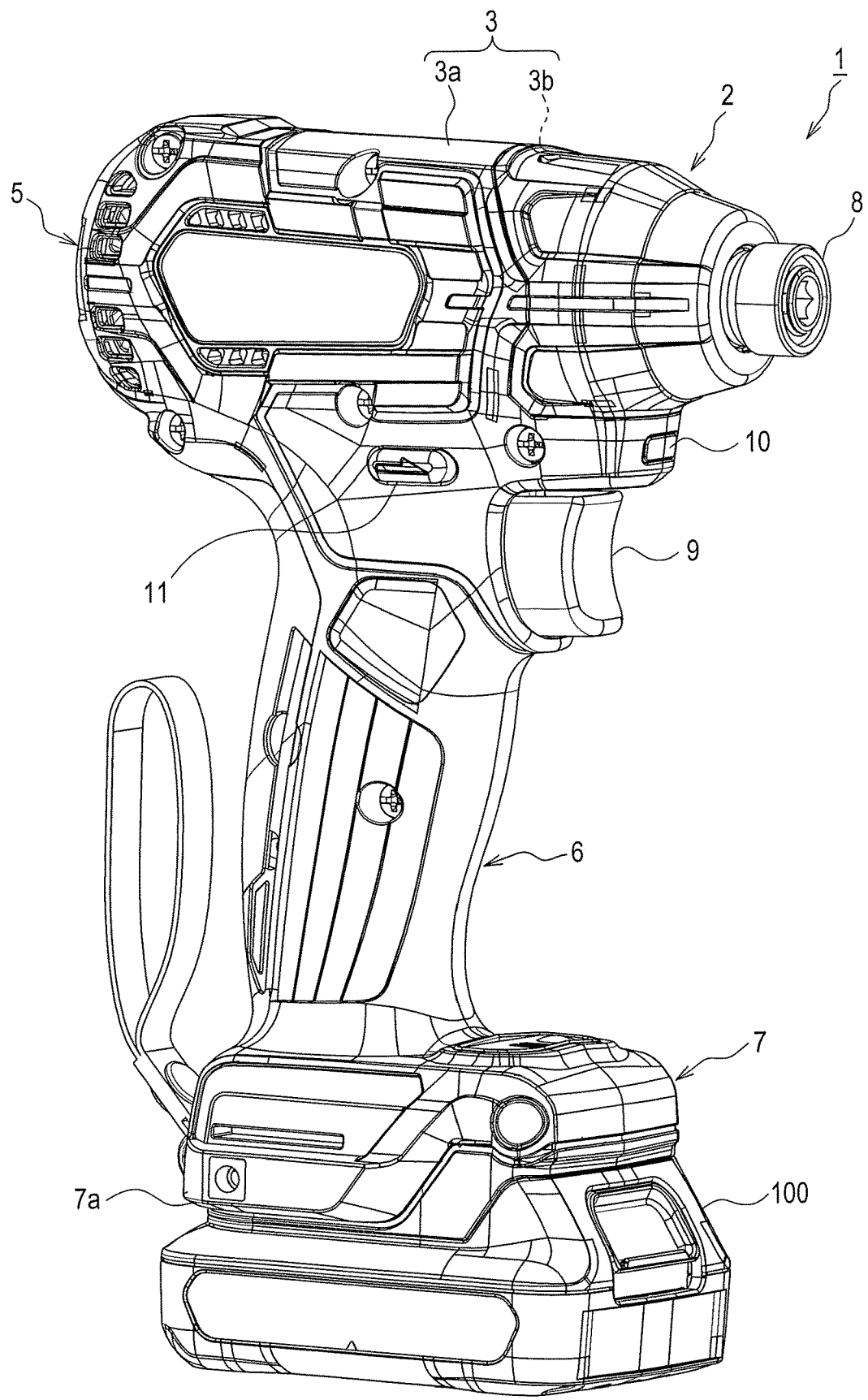
FIG. 1 is a perspective view of an electric working machine of embodiments.

As shown in FIG. 1, an electric working machine 1 is configured as a rechargeable impact driver, for example. The rechargeable impact driver is driven with electric power supplied from a later-described battery pack 100. The rechargeable impact driver is used to rotate a fastening member such as a screw, a bolt and the like. The rechargeable impact driver is configured to apply hammering in a rotation direction in accordance with a load at the time of rotating the fastening member, thereby generating a large torque in the rotation direction.

As shown in FIG. 1, the electric working machine 1 of the present embodiment includes a main body 2 and the battery pack 100. The battery pack 100 is configured to be attached to and detached from the main body 2.

The main body 2 includes a housing 3. The housing 3 includes two half housings 3a, 3b divided into right and left. These half housings 3a, 3b are combined to form the housing 3. The housing 3 may be, for example, an injection molded member including resin.

The main body 2 includes a first storage 5, a grip 6, and a second storage 7. The first storage 5 is provided with a chuck sleeve 8, a LED 10, and a rotation direction switching manipulator 11. The LED 10 emits light to outside of the electric working machine 1. The grip 6 extends from the first storage 5. The second storage 7 extends from the grip 6. The second storage 7 is provided with a battery port 7a to and from which the battery pack 100 is attached and detached.

The battery pack 100 includes a rechargeable battery (not shown) that can be repeatedly charged and discharged. The rechargeable battery, for example, may be a lithium-ion battery, or may be a different type of rechargeable battery than lithium-ion battery. The battery pack 100 has an output voltage VB (hereinafter, battery voltage VB) of 36 [V].

The grip 6 is gripped by a user of the electric working machine 1 when the user uses the electric working machine 1. The grip 6 is provided with a trigger manipulator 9. The user, while gripping the grip 6, can perform a pulling operation of the trigger manipulator 9 (trigger ON manipulation) by a finger.

[1-2. Electrical Configuration of Electric Working Machine]

Figure 2:
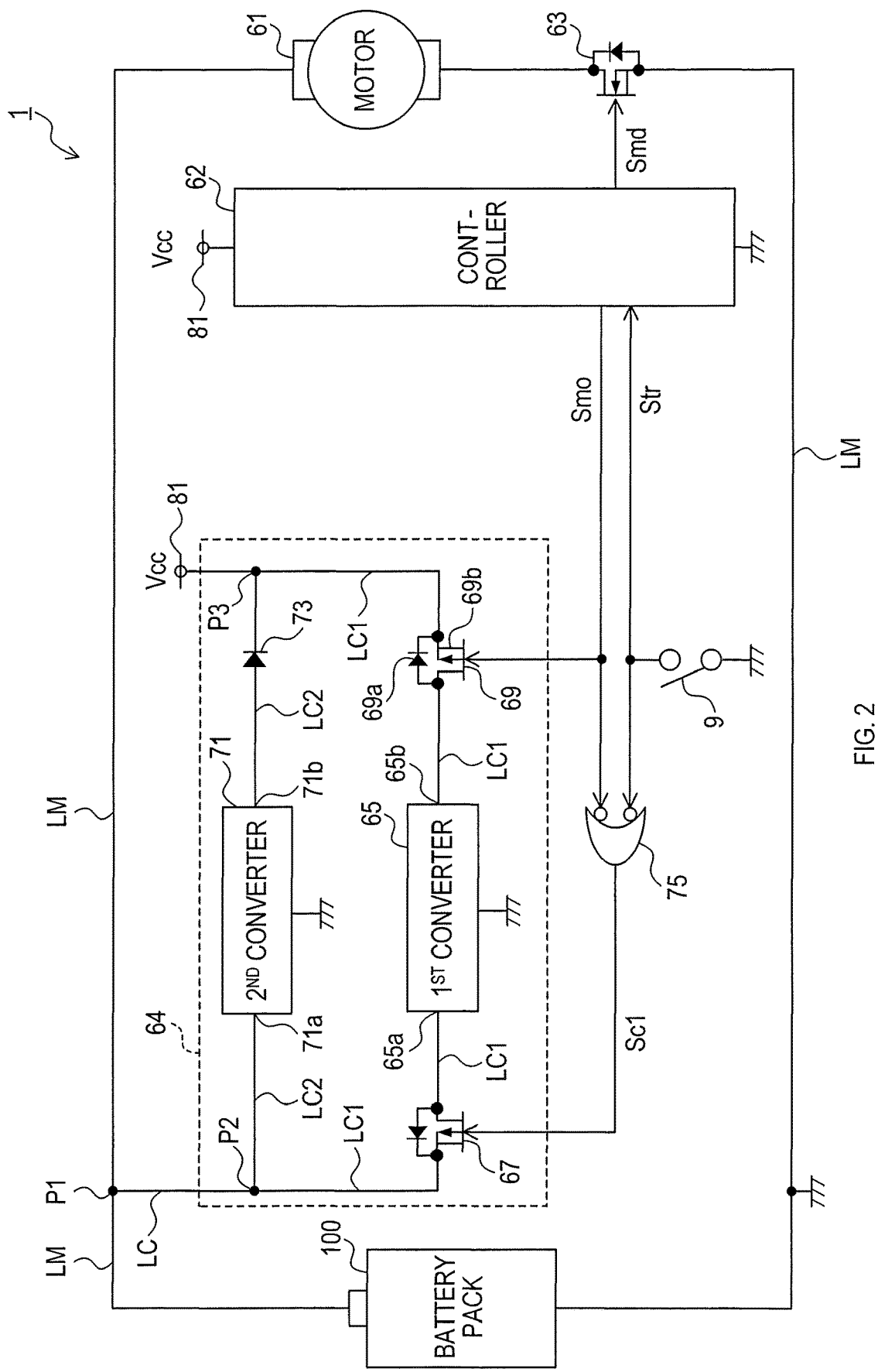
FIG. 2 is a block diagram showing an electrical configuration of the electric working machine in a first embodiment.

FIG. 2 shows an electrical configuration of the electric working machine 1 with the battery pack 100 attached to the main body 2.

As shown in FIG. 2, the electric working machine 1 includes a motor 61, a controller 62, a motor driver 63, a control power source 64, and an operation state determiner 75. The electric working machine 1 includes a motor conduction path LM, a voltage conversion path LC, a first current path LC1, and a second current path LC2.

The motor conduction path LM is a current path from a positive electrode of the battery pack 100 to a negative electrode of the battery pack 100 via the motor 61 and the motor driver 63. A first end of the voltage conversion path LC is coupled to a first junction P1 of the motor conduction path LM, and a second end of the voltage conversion path LC is coupled to the control power source 64 (second junction P2 in detail). The first current path LC1 and the second current path LC2 are provided in the control power source 64.

The motor 61 is a brushed motor. The motor 61 is driven by current conduction using electric power supplied from the battery pack 100 via the motor conduction path LM.

The motor driver 63 is provided with a switcher (such as a FET) coupled in series to the motor conduction path LM. The motor driver 63 is configured to switch the switcher to a conduction state (ON state) or a non-conduction state (OFF state), and switch the motor conduction path LM to a conduction state or a non-conduction state, based on a motor drive command Smd from the controller 62.

The controller 62 includes a microcomputer provided with a CPU, memory devices (ROM and RAM), a signal I/O, etc. The controller 62 receives power supply via a later-described constant voltage supply line 81. The controller 62 executes various processes as the CPU executes various programs stored in the recorders. Examples of various processes include a motor control process to control the motor 61 by the motor drive command Smd, a failure determination process to determine whether there is failure in the electric working machine 1, an operation state switching process to selectively switch operation state of the controller 62 to one of multiple operation states, etc.

The operation state at least includes a control operation state and a low power operation state. The control operation state is a state in which the motor control process, the failure determination process, etc. can be executed. In the control operation state, the controller 62 performs A-D conversion of measurement signals from various sensors (not shown) that measure states (motor temperature, motor current, etc.) of each part of the electric working machine 1 and executes the failure determination process, etc. In case of the control operation state, a constant voltage Vcc supplied from the constant voltage supply line 81 is a reference voltage for A-D conversion. Therefore, high voltage accuracy is required so that voltage error can be reduced. The low power operation state has lower power consumption than the control operation state. The low power operation state is a so-called sleep state in which power consumption in the controller 62 is reduced. In the low power operation state, the controller 62 does not execute A-D conversion, etc., and does not perform comparison processes between the reference voltage (constant voltage Vcc) and measurement signals from various sensors. In case of the low power operation state, the constant voltage Vcc supplied from the constant voltage supply line 81 is not used as the reference voltage for A-D conversion. Therefore, required voltage accuracy is lower than that in the control operation state. A maximum consumption current value of the controller 62 in the control operation state (first control current value ICmax) is 100 mA, and a maximum consumption current value of the controller 62 in the low power operation state (second control current value ISmax) is 50 μA.

The controller 62 is configured to transition the operation state of the controller 62 from the control operation state to the low power operation state when the user does not perform manipulation (such as manipulation of the trigger manipulator 9) for a predefined sleep determination time Ts (5 mins, for example).

The controller 62 is configured to output a state notification signal Smo corresponding to the operation state in execution. In other words, the controller 62 outputs the state notification signal Smo indicating the control operation state (hereinafter, first state notification signal Smo1) when the operation state is transitioned to the control operation state, and outputs the state notification signal Smo indicating the low power operation state (hereinafter, second state notification signal Smo2) when the operation state is transitioned to the low power operation state. The controller 62 outputs the state notification signal Smo at least to the control power source 64 (later-described first reverse flow suppressor 69 in detail) and the operation state determiner 75.

The trigger manipulator 9 is configured to output a trigger signal Str when the user performs the pulling operation. The trigger manipulator 9 is configured to output the trigger signal Str having the same potential as a ground potential during execution of the pulling operation by the user. The trigger signal Str is outputted at least to the controller 62 and the operation state determiner 75.

The operation state determiner 75 is configured to determine whether the operation state of the controller 62 is the control operation state or the low power operation state. The operation state determiner 75 is configured to receive the state notification signal Smo and the trigger signal Str, and output a conduction command signal Sc1 in accordance with each state of the state notification signal Smo and the trigger signal Str.

The operation state determiner 75 is configured to determine that the controller 62 is in the control operation state when the first state notification signal Smo1 or the trigger signal Str is received (in other words, during execution of the pulling operation by the user). The operation state determiner 75 is configured to determine that the controller 62 is in the low power operation state when the second state notification signal Smo2 is received and the trigger signal Str is not received (in other words, the pulling operation by the user is not executed). The operation state determiner 75 is configured to output the conduction command signal Sc1 corresponding to a determination result.

[1-3. Control Power Source]

The control power source 64 converts the battery voltage VB from the battery pack 100 to the constant voltage Vcc, and outputs the constant voltage Vcc to the constant voltage supply line 81. The constant voltage Vcc is supplied to each component (such as the controller 62) of the electric working machine 1 via the constant voltage supply line 81. In the present embodiment, the constant voltage Vcc is 5 [V]. Electric power supplied from the control power source 64 via the constant voltage supply line 81 is used for operation of the controller 62, for example.

The control power source 64 includes a first converter 65, a first switcher 67, the first reverse flow suppressor 69, a second converter 71, a second reverse flow suppressor 73, the first current path LC1, and the second current path LC2.

The first current path LC1 is a part of a current path from the battery pack 100 to the controller 62, and is provided with the first converter 65. The second current path LC2 is coupled in parallel to the first current path LC1, and is provided with the second converter 71. A first end of the first current path LC1 and a first end of the second current path LC2 are coupled to the second junction P2 and the voltage conversion path LC. A second end of the first current path LC1 and a second end of the second current path LC2 are coupled to a third junction P3 and the constant voltage supply line 81.

The first switcher 67, the first converter 65, and the first reverse flow suppressor 69 are arranged in this order from the second junction P2 to the third junction P3 in the first current path LC1.

The first converter 65 includes a DC-DC converter that converts direct voltage and outputs a resulting voltage. The first converter 65 converts the battery voltage VB inputted to the input device 65*a* to the constant voltage Vcc, and outputs the constant voltage Vcc through a first outputter 65*b*. The first converter 65 outputs 5 [V] as the constant voltage Vcc.

The constant voltage Vcc is supplied to each component (such as the controller 62) of the electric working machine 1 via the constant voltage supply line 81. The first converter 65 has a performance of 100 mA or more in maximum output current for voltage conversion, and is configured to supply the maximum consumption current value of the controller 62 in the control operation state (first control current value ICmax). Power consumption required for voltage conversion in the first converter 65 corresponds to consumption current in mA order.

The first switcher 67 is provided in the first current path LC1 between the second junction P2 and the first converter 65. The first switcher 67 is provided with a switcher (such as a FET) coupled in series to the first current path LC1. The first switcher 67 is configured to switch the switcher to a conduction state (ON state) or a non-conduction state (OFF state) based on the conduction command signal Sc1 from the operation state determiner 75. The first switcher 67 is configured to switch electric conduction of the first current path LC1 from the second junction P2 to the first converter 65 to a conduction state or a non-conduction state. This allows the first switcher 67 to switch an input state of the battery voltage VB to the first converter 65 based on the conduction command signal Sc1.

The first reverse flow suppressor 69 is provided in the first current path LC1 between the first converter 65 and the third junction P3. The first reverse flow suppressor 69 includes a diode 69*a* coupled in series to the first current path LC1, and a switcher 69*b* in parallel with the diode 69*a*. The diode 69*a* allows electric conduction from the first converter 65 to the third junction P3, and suppresses electric conduction from the third junction P3 to the first converter 65. In case that the switcher 69*b* is a FET, a parasitic diode always present in the FET may be used as the diode 69*a*. The first reverse flow suppressor 69 is configured to switch the switcher 69*a* to a conduction state (ON state) or a non-conduction state (OFF state) and switch the first current path LC1 to a conduction state or a non-conduction state based on the state notification signal Smo from the controller 62.

As a result, when the switcher 69*b* enters the non-conduction state, the first reverse flow suppressor 69 allows current conduction from the first outputter 65*b* of the first converter 65 to the constant voltage supply line 81 via the diode 69*a*, and suppresses inflow of reverse current from the third junction P3 to the first outputter 65*b* of the first converter 65. At the time of current conduction from the first outputter 65*b* to the constant voltage supply line 81 via the diode 69*a*, the constant voltage Vcc outputted from the first outputter 65*b* drops by a forward voltage (Vf) of the diode 69*a* and is outputted to the constant voltage supply line 81. Also, in the first reverse flow suppressor 69, when the switcher 69*b* enters the conduction state, the constant voltage Vcc outputted from the first outputter 65*b* of the first converter 65 does not drop at the diode 69*a* and is outputted to the constant voltage supply line 81.

The second converter 71 and the second reverse flow suppressor 73 are arranged in this order in the second current path LC2 from the second junction P2 to the third junction P3.

The second converter 71 includes a series regulator that converts direct voltage and outputs a resulting voltage. The second converter 71 converts the battery voltage VB inputted to the input device 71*a* to the constant voltage Vcc, and outputs the constant voltage Vcc through a second outputter 71*b*. The second converter 71 outputs 5 [V] as the constant voltage Vcc. The constant voltage Vcc is supplied to each component (such as the controller 62) of the electric working machine 1 via the constant voltage supply line 81. The second converter 71 has a performance of 50 μA or more in maximum output current for voltage conversion, and is configured to supply the maximum consumption current value of the controller 62 in the low power operation state (second control current value ISmax). Power consumption required for voltage conversion in the second converter 71 corresponds to consumption current in μA order. The second converter 71 has smaller maximum output current than the first control current value ICmax, and thus has smaller power consumption required for voltage conversion than the first converter 65.

The second reverse flow suppressor 73 is provided in the second current path LC2 between the second converter 71 and the third junction P3. The second reverse flow suppressor 73 includes a diode coupled in series to the second current path LC2. This diode is arranged to allow electric conduction from the second converter 71 to the third junction P3 and suppress electric conduction from the third junction P3 to the second converter 71. Thus, the second reverse flow suppressor 73 allows output of voltage dropped from the constant voltage Vcc by the forward voltage (Vf) of the diode from the second outputter 71*b* of the second converter 71 to the constant voltage supply line 81, and suppresses inflow of reverse current from the third junction P3 to the second outputter 71*b* of the second converter 71.

The control power source 64 configured as above outputs the constant voltage Vcc using the first converter 65 and the second converter 71 when receiving the conduction command signal Sc1 indicating the control operation state from the operation state determiner 75, thereby transitioning to a state in which control power is supplied to the controller 62 (hereinafter, first conversion state).

Also, the control power source 64 stops voltage conversion by the first converter 65 and outputs the constant voltage Vcc using the second converter 71 when receiving the conduction command signal Sc1 indicating the low power operation state from the operation state determiner 75, thereby transitioning to a state in which control power is supplied to the controller 62 (hereinafter, second conversion state).

[1-4. Change in Consumption Current Due to Switching of Operation State in Controller]

Change in the consumption current Ia in the control power source 64 due to switching of the operation state of the controller 62 will be described with reference to FIG. 3.

Figure 3:
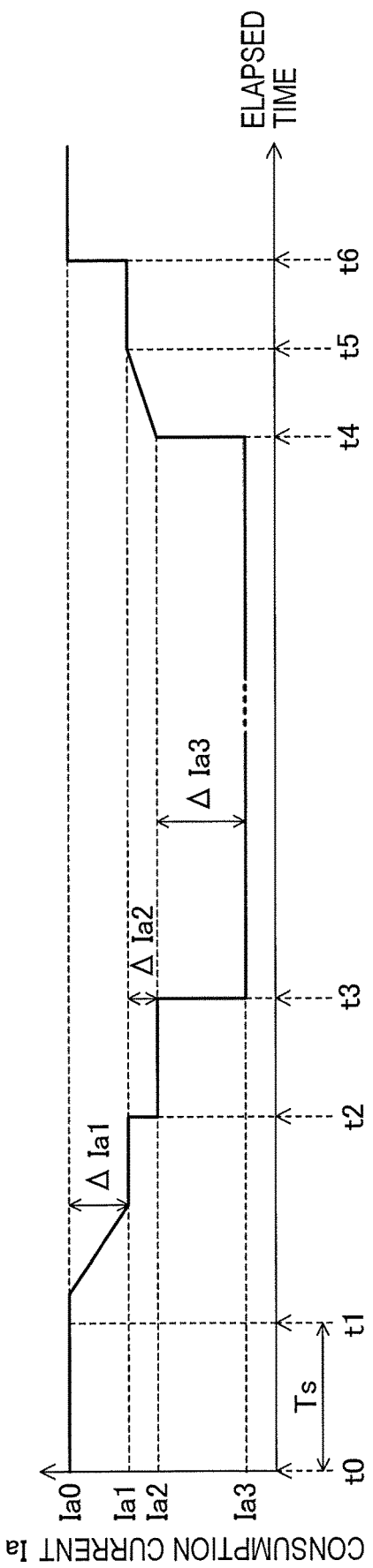
FIG. 3 is a timing chart showing a relationship between switching of operation state of a controller and consumption current in a control power source, in the first embodiment.

FIG. 3 shows switching of the operation state of the controller 62 and change in consumption current due to elapse of time with time t0 as time when the user has ended the pulling operation of the trigger manipulator 9.

During a period from time t0 to time t1 when the sleep determination time Ts has elapsed, when a state continues in which the user does not perform the pulling operation of the trigger manipulator 9, the controller 62 starts a process to transition the operation state (operation state switching process) from the control operation state to the low power operation state.

The controller 62, when starting the operation state switching process, first executes a process to sequentially stop power supply to various devices and various circuits provided in the electric working machine 1. Along with this, the consumption current Ia gradually decreases from an initial consumption current MO (time t1 to t2), and electric current equivalent to current consumption (first current variation Mal) in various devices before stopping is reduced. The consumption current Ia at this time decreases to the first consumption current Ia1.

The controller 62 then executes a process to output the state notification signal Smo indicating the low power operation state, as one step of the operation state switching process (time t2). As a result, voltage conversion by the first converter 65 is stopped, and electric current equivalent to current consumption (second current variation ΔIa2) required for voltage conversion in the first converter 65 is reduced. The consumption current Ia at this time decreases to the second consumption current Ia2.

The controller 62 then executes a process to transition the controller 62 itself to the low power operation state (sleep mode), as a first step in the operation state switching process (time t3). As a result, electric current equivalent to current consumption (third current variation ΔIa3) corresponding to a difference between current consumption in the control operation state and current consumption in the low power operation state of the controller 62 is reduced, and the consumption current Ia at this time decreases to a third consumption current Ia3.

By executing these steps, the controller 62 completes the operation state switching process and maintains the low power operation state until the user performs the pulling operation of the trigger manipulator 9.

Thereafter, when the user performs the pulling operation of the trigger manipulator 9 (time t4), the trigger signal Str is inputted to the controller 62. As a result, the controller 62 itself transitions to the control operation state (wakes up) from the low power operation state (sleep mode). The controller 62 that has waken up starts the operation state switching process to transition the operation state from the low power operation state to the control operation state. Also, when the trigger signal Str from the trigger manipulator 9 is inputted also to the operation state determiner 75, and the conduction command signal Sc1 from the operation state determiner 75 is inputted to the control power source 64, voltage conversion by the first converter 65 is started. Accordingly, along with wake-up of the controller 62 and the voltage conversion operation by the first converter 65, the consumption current Ia gradually increases to the first consumption current Ia1 (time t4 to t5).

The controller 62 then executes a process to output a state notification signal Smo (first state notification signal Smo1) indicating the control operation state, as one step of the operation state switching process (time t5). As a result, the constant voltage Vcc outputted from the first outputter 65*b* of the first converter 65 is supplied to the constant voltage supply line 81 without voltage drop.

The controller 62 then executes a process to sequentially start power supply to various devices and various circuits provided in the electric working machine 1, as one step of the operation state switching process (time t6). Along with this, the consumption current Ia increases to the initial consumption current Ia0.

As above, in case that the operation state of the controller 62 is transitioned to the low power operation state, the electric working machine 1 of the present embodiment can stop voltage conversion in the first converter 65 to reduce the consumption current Ia equivalent to the second current variation ΔIa2.

[1-5. Effect]

As described above, in the electric working machine 1 of the present embodiment, in case that the controller 62 is in the low power operation state, the control power source 64 transitions to the second conversion state, and the first converter 65 is not used for voltage conversion in the control power source 64. Thus, power consumption in the first converter 65 can be suppressed. As a result, in case that the operation state of the controller 62 is transitioned from the control operation state to the low power operation state when the electric working machine 1 is not used, not only power consumption in the controller 62 but also power consumption in the first converter 65 can be reduced. Thus, power consumption when the electric working machine 1 is not used can be reduced.

In the electric working machine 1, the control power source 64 is configured to transition to the operation state to the first conversion state when the electric working machine 1 is manipulated (for example, the pulling operation of the trigger manipulator 9, etc.) by the user. In other words, in case that the trigger manipulator 9 is manipulated by the user when the operation state of the control power source 64 is the second conversion state, the control power source 64 transitions the operation state of the control power source 64 from the second conversion state to the first conversion state. As a result, since at least the first converter 65 supplies the constant voltage Vcc, the controller 62 can receive supply of the first control current value ICmax required in the control operation state, and control the motor 61.

The electric working machine 1 includes the first reverse flow suppressor 69. Therefore, inflow of reverse current to the first outputter 65b of the first converter 65 can be suppressed. As a result, the electric working machine 1 can suppress inflow of electric current outputted from the second converter 71 to the first outputter 65b of the first converter 65 via the third junction P3 by the first reverse flow suppressor 69.

The electric working machine 1 includes the second reverse flow suppressor 73. Therefore, inflow of reverse current to the second outputter 71b of the second converter 71 can be suppressed. As a result, the electric working machine 1 can suppress inflow of electric current outputted from the first converter 65 to the second outputter 71b of the second converter 71 via the third junction P3 by the second reverse flow suppressor 73.

In the electric working machine 1, the output voltage (constant voltage Vcc=5 [V]) of the first converter 65 and the output voltage (constant voltage Vcc=5 [V]) of the second converter 71 have the same voltage value, and the first reverse flow suppressor 69 is provided with the switcher 69b in parallel with the diode 69a and the second reverse flow suppressor 73 includes a diode. Thus, in case that the controller 62 enters the control operation state and both the first converter 65 and the second converter 71 output voltage, as well as the switcher 69b is ON, the voltage outputted from the first converter 65 to the constant voltage supply line 81 and the voltage outputted from the second converter 71 to the constant voltage supply line 81 via the second reverse flow suppressor 73 have different values. Specifically, in case that the controller 62 is in the control operation state, the voltage outputted from the first converter 65 to the constant voltage supply line 81 is the constant voltage Vcc while the voltage outputted from the second converter 71 to the constant voltage supply line 81 via the second reverse flow suppressor 73 is a voltage dropped from the constant voltage Vcc by the forward voltage (Vf) of the diode. Accordingly, in case that the controller 62 is in the control operation state, only the voltage outputted from the first converter 65 is supplied to the controller 62. Thus, it is possible to refrain from supplying the maximum consumption current value of the controller 62 from the second converter 71 having no supply capacity.

In the electric working machine 1, the operation state determiner 75 is configured to receive the first state notification signal Smo1 and the second state notification signal Smo2. The operation state determiner 75, when receiving the first state notification signal Smo1, determines that the operation state of the controller 62 is the control operation state, and, when receiving the second state notification signal Smo2, determines that the operation state of the controller 62 is the low power operation state. In other words, the operation state determiner 75 can determine the operation state of the controller 62 based on the first state notification signal Smo1 and the second state notification signal Smo2.

[1-6. Correspondence Relationship Between Terms]

The motor 61 corresponds to one example of a driving device, and the battery pack 100 corresponds to one example of a power source.

The controller 62 and the motor driver 63 correspond to one example of a controller.

2. Second Embodiment

As the second embodiment, a second electric working machine 21 configured by replacing some components of the electric working machine 1 in the aforementioned embodiment (hereinafter, first embodiment) will be described.

Figure 4:
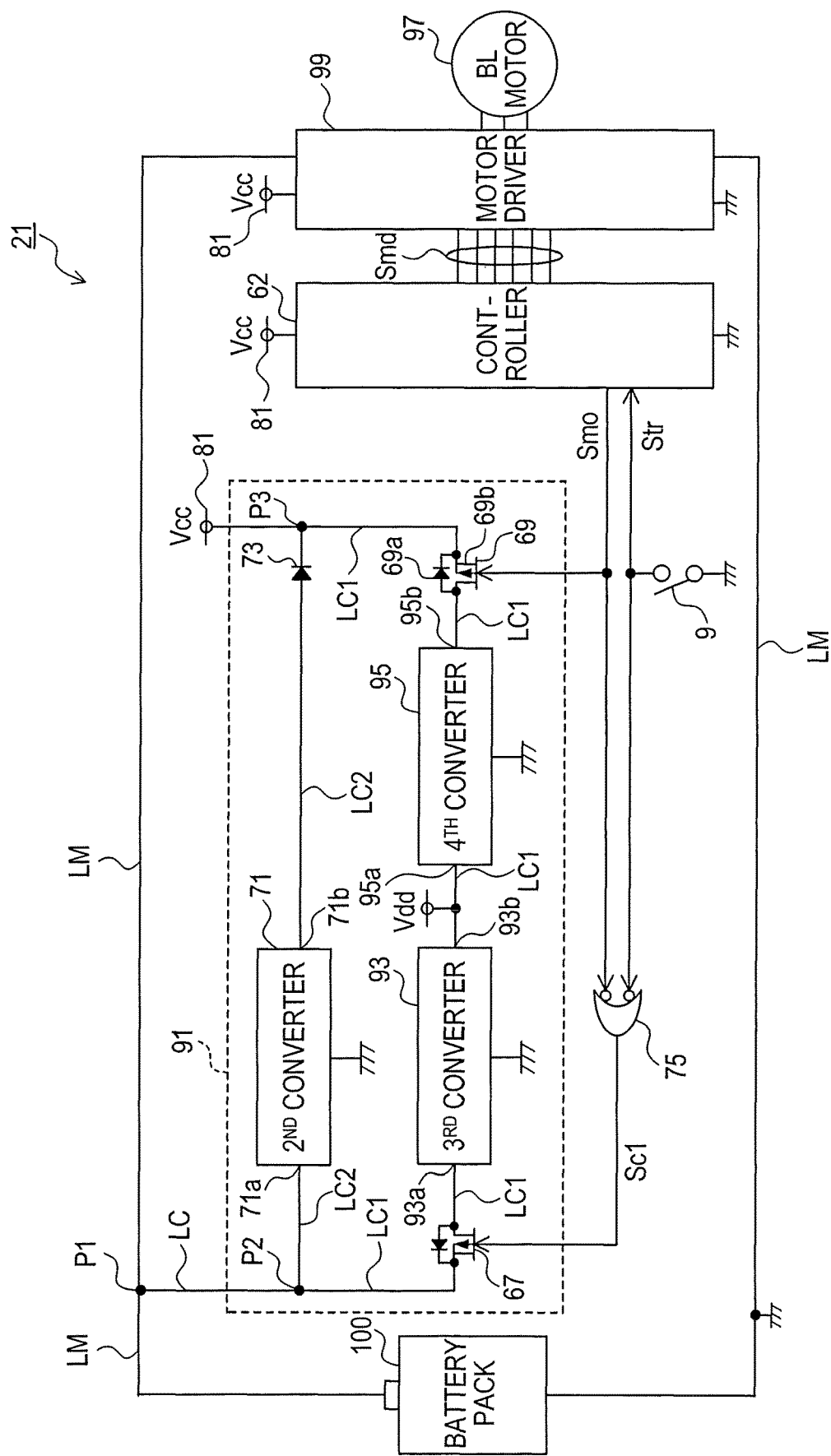
FIG. 4 is a block diagram showing an electrical configuration of the electric working machine in a second embodiment.

As shown in FIG. 4, the second electric working machine 21 includes a second control power source 91, a brushless motor 97, and a motor driver 99 in place of the control power source 64, the motor 61, the motor driver 63 of the electric working machine 1.

[2-1. Second Control Power Source]

The second control power source 91 includes a third converter 93 and a fourth converter 95 in place of the first converter 65 of the control power source 64.

The third converter 93 includes a DC-DC converter that converts direct voltage and outputs a converted voltage. The third converter 93 converts the battery voltage VB inputted to the input device 93a to a second constant voltage Vdd, and outputs the second constant voltage Vdd through the outputter 93b. The third converter 93 outputs 15 [V] as the second constant voltage Vdd. The third converter 93 has a maximum output current of 150 mA for voltage conversion.

The fourth converter 95 includes a series regulator that converts direct voltage and outputs a converted voltage. The fourth converter 95 converts the second constant voltage Vdd inputted to the input device 95a to the constant voltage Vcc, and outputs the constant voltage Vcc through the outputter 95b. The fourth converter 95 outputs 5 [V] as the constant voltage Vcc. The fourth converter 95 has a maximum output current of 100 mA for voltage conversion.

In other words, the second control power source 91 can convert the battery voltage VB to the constant voltage Vcc using the third converter 93 and the fourth converter 95. The constant voltage Vcc is supplied to each component (such as the controller 62) of the second electric working machine 21 via the constant voltage supply line 81. Power consumption required for voltage conversion in the third converter 93 and the fourth converter 95 corresponds to consumption current in mA order.

The second control power source 91 configured as above, when receiving the conduction command signal Sc1 indicating the control operation state from the operation state determiner, outputs the constant voltage Vcc using the third converter 93 and the fourth converter 95, and outputs the constant voltage Vcc using the second converter 71, thereby transitioning to a state to supply control power to the controller 62 (hereinafter, first conversion state).

Also, the second control power source 91, when receiving the conduction command signal Sc1 indicating the low power operation state from the operation state determiner 75, stops voltage conversion by the third converter 93 and the fourth converter 95, and outputs the constant voltage Vcc using the second converter 71, thereby transitioning to a state to supply control power to the controller 62 (hereinafter, second conversion state).

The brushless motor 97 includes a 3-phase brushless motor. The motor driver 99 converts a direct current from the battery pack 100 to 3-phase AC current (U-PHASE drive current, V-PHASE drive current, and W-PHASE drive current) for driving the brushless motor 97 and outputs the current to the brushless motor 97. The motor driver 99 drives the brushless motor 97 in accordance with the motor drive command Smd inputted from the controller 62.

[2-2. Change in Consumption Current Due to Switching of Operation State in Controller]

Change in the consumption current Ia in the second control power source 91 due to switching of the operation state of the controller 62 will be described with reference to FIG. 5.

Figure 5:
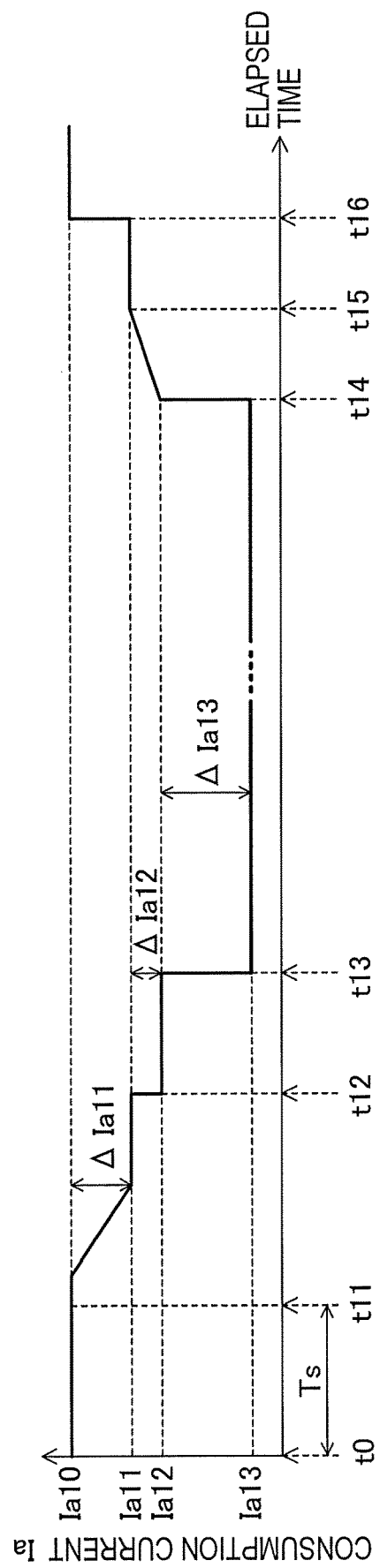
FIG. 5 is a timing chart showing a relationship between switching of operation state of the controller and consumption current in a second control power source, in the second embodiment.

FIG. 5 shows switching of the operation state of the controller 62 and change in the consumption current Ia due to elapse of time with time t0 as time when the user has ended the pulling operation of the trigger manipulator 9.

During a period from time t0 to time t11 when the sleep determination time Ts has elapsed, when a state continues in which the user does not perform the pulling operation of the trigger manipulator 9, the controller 62 starts a process to transition the operation state (operation state switching process) from the control operation state to the low power operation state.

The controller 62, when starting the operation state switching process, first executes a process to sequentially stop power supply to various devices and various circuits provided in the second electric working machine 21. Along with this, the consumption current Ia gradually decreases from a tenth consumption current Ia10 (time t11 to t12), and electric current equivalent to current consumption (first current variation Mall) in various devices before stopping is reduced. The consumption current Ia at this time decreases to an eleventh consumption current Ia11.

The controller 62 then executes a process to output the state notification signal Smo indicating the low power operation state, as one step of the operation state switching process (time t12). As a result, voltage conversion by the third converter 93 and the fourth converter 95 is stopped, and electric current equivalent to current consumption (second current variation ΔIa12) required for voltage conversion in the third converter 93 and the fourth converter 95 is reduced. The consumption current Ia at this time decreases to a twelfth consumption current Ia12.

The controller 62 executes a process to transition the controller 62 itself to the low power operation state (sleep mode), as one step of the operation state switching process (time t13). As a result, electric current equivalent to current consumption (third current variation ΔIa13) corresponding to a difference between current consumption in the control operation state and current consumption in the low power operation state of the controller 62 is reduced. The consumption current Ia at this time decreases to a thirteenth consumption current Ia13.

By executing these steps, the controller 62 completes the operation state switching process and maintains the low power operation state until the user performs the pulling operation of the trigger manipulator 9.

Thereafter, when the user performs the pulling operation of the trigger manipulator 9 (time t14), the controller 62 receives the trigger signal Str. As a result, the controller 62 itself transitions to the control operation state (wakes up) from the low power operation state (sleep mode). The controller 62 that has waken up starts the operation state switching process to transition the operation state from the low power operation state to the control operation state. Also, the trigger signal Str from the trigger manipulator 9 is inputted also to the operation state determiner 75, and the conduction command signal Sc1 from the operation state determiner 75 is inputted to the second control power source 91. As a result, voltage conversion by the third converter 93 and the fourth converter 95 is started. Accordingly, along with wake-up of the controller 62 and the voltage conversion operation of the third converter 93 and the fourth converter 95, the consumption current Ia gradually increases to the eleventh consumption current Ia11 (time t14 to t15).

The controller 62 then executes a process to output the state notification signal Smo (first state notification signal Smo1) indicating the control operation state, as one step of the operation state switching process (time t15). As a result, the constant voltage Vcc outputted from the outputter 95b of the fourth converter 95 is supplied to the constant voltage supply line 81 without voltage drop.

The controller 62 then executes a process to sequentially start power supply to various devices and various circuits provided in the second electric working machine 21, as one step of the operation state switching process (time t16). Along with this, the consumption current Ia increases to the tenth consumption current Ia10.

As above, the second electric working machine 21 stops voltage conversion in the third converter 93 and the fourth converter 95 in case that the operation state of the controller 62 is transitioned to the low power operation state. Thus, the consumption current Ia equivalent to the second current variation ΔIa12 can be reduced.

[2-3. Effect]

As described above, in the second electric working machine 21 of the second embodiment, in case that the controller 62 is in the low power operation state, the second control power source 91 transitions to the second conversion state, and the third converter 93 and the fourth converter 95 are not used for voltage conversion in the second control power source 91. Thus, the power consumption in the third converter 93 and the fourth converter 95 can be suppressed. As a result, in case that the operation state of the controller 62 is transitioned from the control operation state to the low power operation state when the second electric working machine 21 is not used, not only power consumption in the controller 62 but also power consumption in the third converter 93 and the fourth converter 95 can be reduced. Thus, power consumption when the second electric working machine 21 is not used can be reduced.

[2-4. Correspondence Relationship Between Terms]

The controller 62 and the motor driver 99 correspond to one example of the controller, the brushless motor 97 corresponds to one example of the driving device, and the third converter 93 and the fourth converter 95 correspond to one example of the first converter.

3. Third Embodiment

As the third embodiment, a third electric working machine 23 configured by replacing some components of the second electric working machine 21 in the second embodiment will be described.

Figure 6:
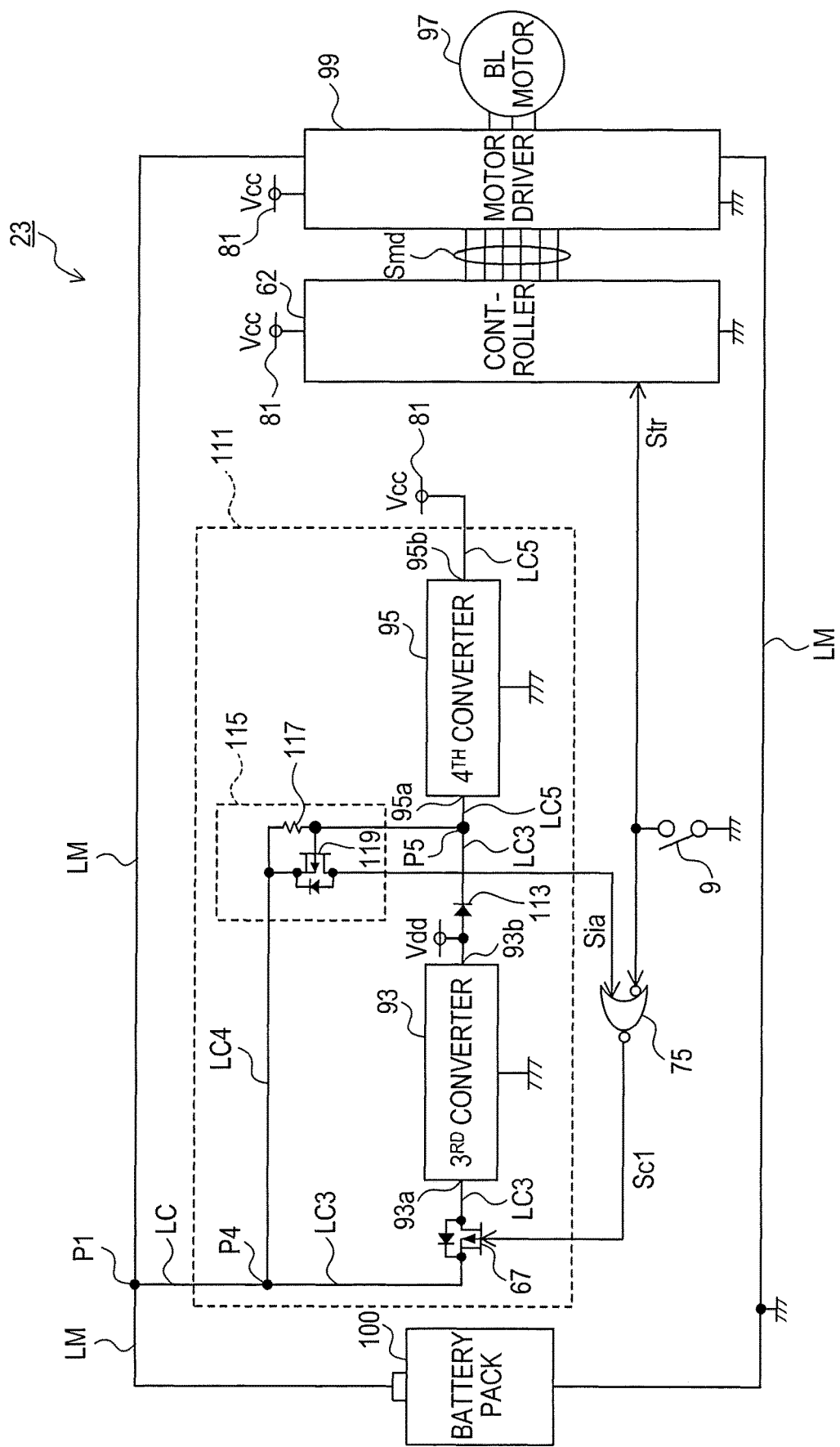
FIG. 6 is a block diagram showing an electrical configuration of the electric working machine in a third embodiment.

As shown in FIG. 6, the third electric working machine 23 includes a third control power source 111 in place of the second control power source 91 of the second electric working machine 21.

[3-1. Third Control Power Source]

The third control power source 111 converts the battery voltage VB to the constant voltage Vcc, and outputs the constant voltage Vcc to the constant voltage supply line 81. The constant voltage Vcc is supplied to each part (such as the controller 62) of the third electric working machine 23 via the constant voltage supply line 81. In the third embodiment, the constant voltage Vcc is 5 [V]. Electric power supplied via the constant voltage supply line 81 is used, for example, as operating power of the controller 62, etc.

The third control power source 111 includes the third converter 93, the first switcher 67, a reverse flow suppressor 113, the fourth converter 95, a bypass current determiner 115, a third current path LC3, a bypass current path LC4, and a common current path LC5.

The third converter 93, the first switcher 67, the fourth converter 95 in the third embodiment have the same configuration as those in the second embodiment.

The third current path LC3 is a part of the current path from the battery pack 100 to the controller 62, and is provided with the third converter 93. The bypass current path LC4 is coupled in parallel to the third current path LC3. The common current path LC5 is directly coupled to the third current path LC3 and the bypass current path LC4, and is provided with the fourth converter 95.

A first end of the third current path LC3 and a first end of the bypass current path LC4 are coupled to a fourth junction P4 and the voltage conversion path LC. A second end of the third current path LC3 and a second end of the bypass current path LC4 are coupled to a fifth junction P5 and are coupled to a first end of the common current path LC5. A second end of the common current path LC5 is coupled to the constant voltage supply line 81.

The reverse flow suppressor 113 is provided in the third current path LC3 between the third converter 93 and the fifth junction P5. The reverse flow suppressor 113 is provided with a diode coupled in series to the third current path LC3. This diode is arranged to allow electric conduction from the third converter 93 to the fifth junction P5 and suppress electric conduction from the fifth junction P5 to the third converter 93. Thus, the reverse flow suppressor 113 allows output of the constant voltage Vcc from the outputter 93b of the third converter 93 to the fifth junction P5 and suppresses inflow of reverse current from the fifth junction P5 to the outputter 93b of the third converter 93.

The bypass current determiner 115 is provided in the bypass current path LC4. The bypass current determiner 115 includes a detection resistor 117 and a current determiner 119. The detection resistor 117 includes a resistive element coupled in series to the bypass current path LC4 and can output detection voltage corresponding to bypass current Ibp flowing through the bypass current path LC4. The current determiner 119 includes a FET, and is configured to output current notification signal Sia corresponding to the bypass current Ibp to the operation state determiner 75 based on voltage between both ends of the detection resistor 117.

In case that the first switcher 67 is OFF, and the operation state of the controller 62 is in the control operation state, power consumption in the controller 62 and the like via the constant voltage supply line 81 increases and the bypass current Ibp increases. Thus, potential of the input device 95a of the fourth converter 95 decreases. Also, in case that the first switcher 67 is OFF and the operation state of the controller 62 is in the low power operation state, power consumption in the controller 62 and the like via the constant voltage supply line 81 decreases and the bypass current Ibp decreases. Thus, potential of the input device 95a of the fourth converter 95 increases.

The current determiner 119 is configured to output the current notification signal Sia corresponding to the bypass current Ibp. In case that the bypass current Ibp is larger than a predefined operation reference value Ith (for example, 5 [mA]), the FET is turned on, and the current determiner 119 outputs the current notification signal Sia having the same potential as that of the battery voltage VB (hereinafter, first current notification signal Sia1). In case that the bypass current Ibp is equal to or smaller than the operation reference value Ith, the FET is turned off, and the current determiner 119 outputs the current notification signal Sia having potential lower than that of the battery voltage VB (hereinafter, second current notification signal Sia2).

In other words, the bypass current determiner 115 is configured to determine whether the operation state of the controller 62 is the control operation state or the low power operation state based on a result of comparison between the bypass current Ibp and the operation reference value Ith.

The current determiner 119, when determining that the operation state of the controller 62 is the control operation state, outputs the first current notification signal Sia1 to the operation state determiner 75. As a result, the conduction command signal Sc1 indicating the control operation state is outputted from the operation state determiner 75 to the first switcher 67, and voltage conversion by the third converter 93 is executed. At this time, the third control power source 111 outputs the constant voltage Vcc using the third converter 93 and the fourth converter 95, thereby transitioning a state to supply control power to the controller 62 (hereinafter, first conversion state).

The current determiner 119, when determining that the operation state of the controller 62 is the low power operation state, outputs the second current notification signal Sia2 to the operation state determiner 75. As a result, the conduction command signal Sc1 indicating the low power operation state is outputted from the operation state determiner 75 to the first switcher 67, and voltage conversion by the third converter 93 is stopped. At this time, the third control power source 111 outputs the constant voltage Vcc using the fourth converter 95, thereby transitioning to a state to supply control power to the controller 62 (hereinafter, second conversion state)

[3-2. Change in Consumption Current Due to Switching of Operation State in Controller]

Change in the consumption current Ia in the third control power source 111 due to switching of the operation state of the controller 62 will be described with reference to FIG. 7.

Figure 7:
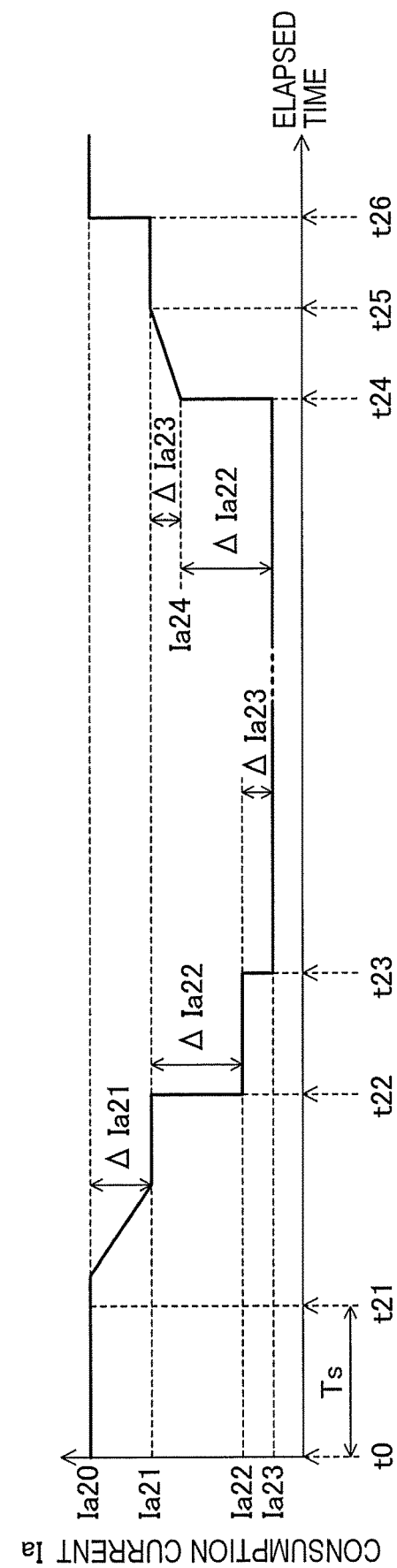
FIG. 7 is a timing chart showing a relationship between switching of operation state of the controller and consumption current in a third control power source, in the third embodiment.

FIG. 7 shows switching of the operation state of the controller 62 and change in consumption current due to elapse of time with time t0 as time when the user has ended the pulling operation of the trigger manipulator 9.

During a period from time t0 to time t21 when the sleep determination time Ts has elapsed, when a state continues in which the user does not perform the pulling operation of the trigger manipulator 9, the controller 62 starts a process to transition the operation state (operation state switching process) from the control operation state to the low power operation state.

The controller 62, when starting the operation state switching process, first executes a process to sequentially stop power supply to various devices and various circuits provided in the third electric working machine 23. Along with this, the consumption current Ia gradually decreases from a twentieth consumption current Ia20 (time t21 to t22), and electric current equivalent to the current consumption (first current variation ΔIa21) in various devices before stopping is reduced. The consumption current Ia at this time decreases to a twenty-first consumption current Ia21.

The controller 62 then executes a process to transition the controller 62 itself to the low power operation state (sleep mode), as one step of the operation state switching process (time t22). As a result, electric current equivalent to current consumption (second current variation ΔIa22) corresponding to a difference between current consumption in the control operation state and current consumption in the low power operation state of the controller 62 is reduced, and the consumption current Ia at this time decreases to a twenty-second consumption current Ia22. The second current variation ΔIa22 corresponds to the third current variation ΔIa3 of the first embodiment and the third current variation ΔIa13 of the second embodiment.

Thereafter, when the bypass current determiner 115 determines that the operation state of the controller 62 is the low power operation state due to decrease in current consumption of the controller 62, the conduction command signal Sc1 indicating the low power operation state is outputted from the operation state determiner 75 to the first switcher 67, and voltage conversion by the third converter 93 is stopped. As a result, electric current equivalent to current consumption (third current variation ΔIa23) required for voltage conversion in the third converter 93 is reduced, and the consumption current Ia at this time decreases to a twenty-third consumption current Ia23. The third current variation ΔIa23 corresponds to the second current variation ΔIa2 of the first embodiment and the second current variation ΔIa12 of the second embodiment.

By executing these steps, the controller 62 completes the operation state switching process, and maintains the low power operation state until the user performs the pulling operation of the trigger manipulator 9.

Thereafter, when the user performs the pulling operation of the trigger manipulator 9 (time t24), the trigger signal Str is inputted to the controller 62. As a result, the controller 62 itself transitions to the control operation state (wakes up) from the low power operation state (sleep mode). The controller 62 that has waken up starts the operation state switching process to transition the operation state from the low power operation state to the control operation state. Also, when the trigger signal Str from the trigger manipulator 9 is inputted also to the operation state determiner 75, and the conduction command signal Sc1 from the operation state determiner 75 is inputted to the third control power source 111, voltage conversion by the third converter 93 is started. Accordingly, along with wake-up of the controller 62 and the voltage conversion operation by the third converter 93, the consumption current Ia gradually increases to the twenty-first consumption current Ia21 (time t24 to t25). The consumption current Ia is increased by the second current variation ΔIa22 from the twenty-third consumption current Ia23 by wake-up of the controller 62 and becomes a twenty-fourth consumption current Ia24 (time t24). Thereafter, the consumption current Ia is increased by the third current variation ΔIa23 by the voltage conversion operation of the third converter 93 and becomes the twenty-first consumption current Ia21 (time t25).

At this time, when the bypass current determiner 115 determines that the operation state of the controller 62 is the control operation state due to increase in current consumption in the controller 62, the conduction command signal Sc1 indicating the control operation state is outputted from the operation state determiner 75 to the first switcher 67. At this time, voltage conversion by the third converter 93 is already executed based on the trigger signal Str from the trigger manipulator 9. However, even if manipulation of the trigger manipulator 9 by the user is ended, the control operation state of the controller 62 is maintained and voltage conversion by the third converter 93 continues until the sleep determination time Ts elapses.

The controller 62 then executes a process to sequentially start power supply to various devices and various circuits provided in the third electric working machine 23, as one step in the operation state switching process (time t26). Along with this, the consumption current Ia increases to a twentieth consumption current Ia20.

As above, the third electric working machine 23, when the operation state of the controller 62 is transitioned to the low power operation state, stops voltage conversion in the third converter 93 based on the determination result by the bypass current determiner 115, thereby reducing the consumption current Ia equivalent to the third current variation ΔIa23.

[3-3. Effect]

As described above, in the third electric working machine 23 of the third embodiment, in case that the controller 62 is in the low power operation state, the third control power source 111 transitions to the second conversion state based on the determination result by the bypass current determiner 115, and the third converter 93 is not used for voltage conversion in the third control power source 111. Thus, power consumption in the third converter 93 can be suppressed. As a result, in case that the operation state of the controller 62 is transitioned from the control operation state to the low power operation state when the third electric working machine 23 is not used, not only power consumption in the controller 62 but also power consumption in the third converter 93 can be reduced. Thus, power consumption when the third electric working machine 23 is not used can be reduced.

[3-4. Correspondence Between Terms]

The controller 62 and the motor driver 99 correspond to one example of the controller, the brushless motor 97 corresponds to one example of the driving device, the third converter 93 corresponds to one example of the first converter, and the fourth converter 95 corresponds to one example of the second converter.

The operation state determiner 75 and the bypass current determiner 115 corresponds to one example of the operation state determiner, and the second constant voltage Vdd corresponds to one example of a first control voltage.

4. Fourth Embodiment

As the fourth embodiment, a fourth electric working machine 25 configured by replacing some components of the third electric working machine 23 in the third embodiment will be described.

Figure 8:
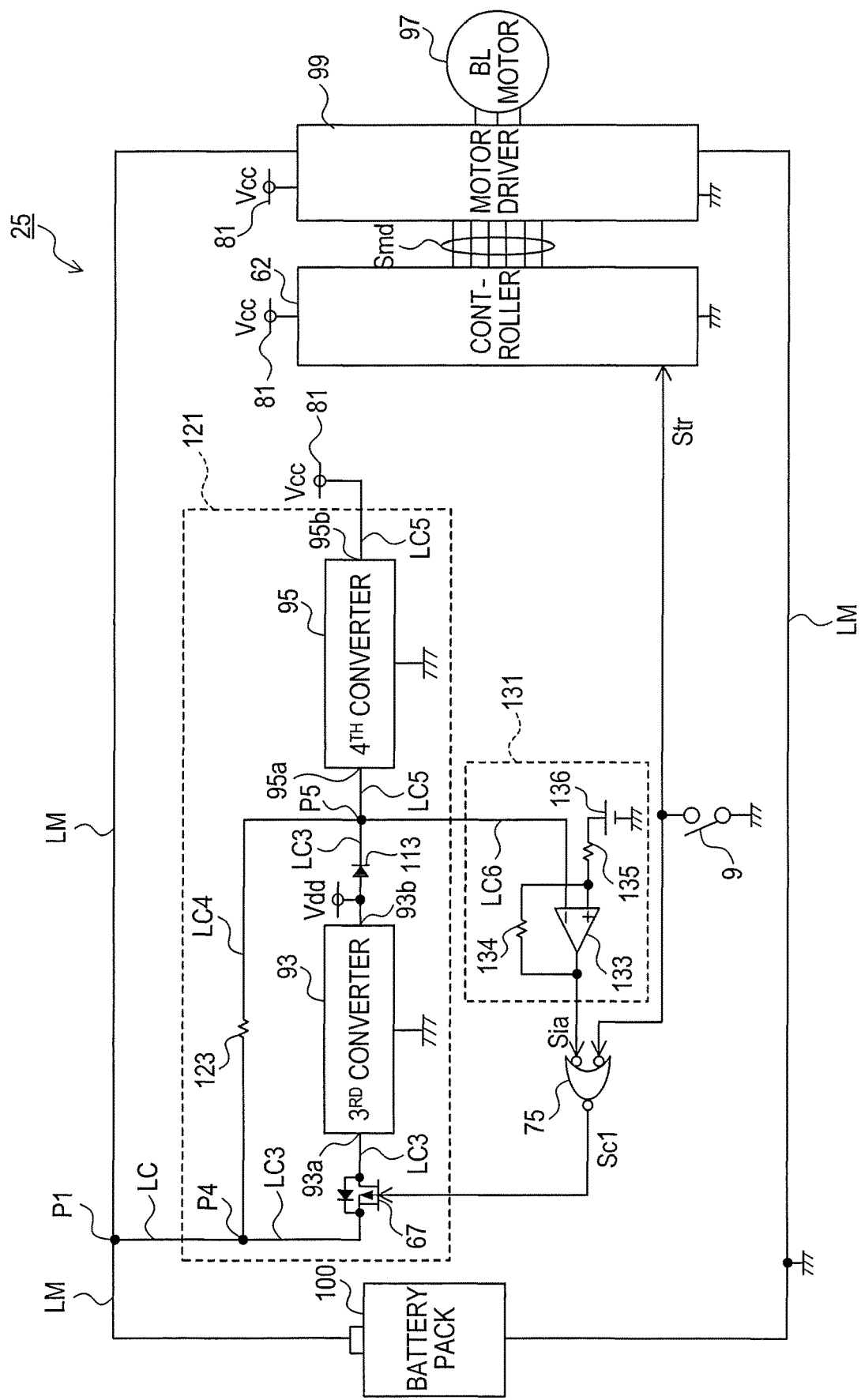
FIG. 8 is a block diagram showing an electrical configuration of the electric working machine in a fourth embodiment.

As shown in FIG. 8, the fourth electric working machine 25 includes a fourth control power source 121 and a second bypass current determiner 131 in place of the third control power source 111 and the bypass current determiner 115 of the third electric working machine 23, respectively.

[4-1. Fourth Control Power Source]

The fourth control power source 121 converts the battery voltage VB to the constant voltage Vcc, and outputs the constant voltage Vcc to the constant voltage supply line 81. The constant voltage Vcc is supplied to each part (such as the controller 62) of the fourth electric working machine 25 via the constant voltage supply line 81. In the fourth embodiment, the constant voltage Vcc is 5 [V]. Electric power supplied from the fourth control power source 121 via the constant voltage supply line 81 is used, for example, as operating power of the controller 62, etc.

The fourth control power source 121 includes the third converter 93, the first switcher 67, the reverse flow suppressor 113, the fourth converter 95, a limiting resistor 123, the third current path LC3, the bypass current path LC4, and the common current path LC5.

The third converter 93, the first switcher 67, the fourth converter 95, the third current path LC3, the bypass current path LC4, and the common current path LC5 in the fourth embodiment have the same configuration as those of the third embodiment.

The limiting resistor 123 is coupled in series to the bypass current path LC4. The limiting resistor 123 includes a resistive element, and keeps the bypass current Ibp flowing through the bypass current path LC4 from becoming excessive.

The second bypass current determiner 131 includes a hysteresis comparator 133, a resistor 135, a resistor 134, and a reference voltage 136. The second bypass current determiner 131 is electrically coupled to the fifth junction P5 via the sixth path LC6, and is configured to detect potential of the input device 95*a* of the fourth converter 95 and detect the bypass current Ibp. The second bypass current determiner 131 is configured to output the current notification signal Sia corresponding to the bypass current Ibp to the operation state determiner 75.

As described in the third embodiment, in case that the first switcher 67 is OFF, and the operation state of the controller 62 is the control operation state, power consumption in the controller 62, etc. via the constant voltage supply line 81 increases, and the bypass current Ibp increases. Thus, potential of the input device 95*a* of the fourth converter 95 decreases. Also, in case that the first switcher 67 is OFF, and the operation state of the controller 62 is the low power operation state, power consumption in the controller 62, etc. via the constant voltage supply line 81 decreases, and the bypass current Ibp decreases. Thus, potential of the input device 95*a* of the fourth converter 95 increases.

The second bypass current determiner 131, outputs the current notification signal Sia having the same potential as the battery voltage VB (hereinafter, first current notification signal Sia1), when a specific condition is satisfied. The specific condition herein is that the bypass current Ibp is larger than a predefined operation reference value Ith (for example, 5 [mA]), and potential of the fifth junction P5 (inputter 95*a* of the fourth converter 95) is lower than a determination voltage Vth. The second bypass current determiner 131, when the bypass current Ibp is equal to or lower than the operation reference value Ith, and potential of the fifth junction P5 (input device 95*a* of the fourth converter 9) exceeds the determination voltage Vth, outputs the current notification signal Sia having lower potential than the battery voltage VB (hereinafter, second current notification signal Sia2).

In other words, the second bypass current determiner 131 is configured to determine whether the operation state of the controller 62 is the control operation state or the low power operation state based on the result of comparison between the bypass current Ibp and the operation reference value Ith.

The second bypass current determiner 131 includes the hysteresis comparator 133, and can set the determination voltage Vth used for output determination of the first current notification signal Sia1 (hereinafter, first determination voltage Vth1) and the determination voltage Vth used for output determination of the second current notification signal Sia2 (hereinafter, second determination voltage Vth2) to different values.

For example, in case that output voltage of the reference voltage 136 is set to be the determination voltage Vth (=Vdd+ΔVa=17 [V]) obtained by adding a specified adjustment voltage ΔVa (=2 [V]) to the second constant voltage Vdd, and a hysteresis width by the hysteresis comparator 133 is set to 1 [V], the first determination voltage Vth1 is 16 [V] and the second determination voltage Vth2 is 18 [V].

In this case, when potential of the fifth junction P5 (input device 95*a* of the fourth converter 95) falls below 16 [V], the second bypass current determiner 131 determines that the operation state of the controller 62 is the control operation state, and starts output of the first current notification signal Sia1. Thereafter, while potential of the fifth junction P5 is equal to or below 18 [V], the second bypass current determiner 131 determines that the operation state of the controller 62 is the control operation state, and continues output of the first current notification signal Sia1. Thereafter, when potential of the fifth junction P5 exceeds 18 [V], the second bypass current determiner 131 determines that the operation state of the controller 62 is the low power operation state, and starts output of the second current notification signal Sia2. Thereafter, while potential of the fifth junction P5 is equal to or above 16 [V], the second bypass current determiner 131 determines that the operation state of the controller 62 is the low power operation state, and continues output of the second current notification signal Sia2. Thereafter, when potential of the fifth junction P5 falls below 16 [V], the second bypass current determiner 131 starts output of the first current notification signal Sia1.

The second bypass current determiner 131 outputs the first current notification signal Sia1 to the operation state determiner 75 when determining that the operation state of the controller 62 is the control operation state. As a result, the conduction command signal Sc1 indicating the control operation state is outputted from the operation state determiner 75 to the first switcher 67, and voltage conversion by the third converter 93 is executed. At this time, the fourth control power source 121 outputs the constant voltage Vcc using the third converter 93 and the fourth converter 95, thereby transitioning to a state to supply control power to the controller 62 (hereinafter, first conversion state).

The second bypass current determiner 131 outputs the second current notification signal Sia2 to the operation state determiner 75 when determining that the operation state of the controller 62 is the low power operation state. As a result, the conduction command signal Sc1 indicating the low power operation state is outputted from the operation state determiner 75 to the first switcher 67, and voltage conversion by the third converter 93 is stopped. At this time, the fourth control power source 121 outputs the constant voltage Vcc using the fourth converter 95, thereby transitioning to a state to supply control power to the controller 62 (hereinafter, second conversion state).

[4-2. Change in Consumption Current Due to Switching of Operation State in Controller]

Change in the consumption current Ia in the fourth control power source 121 due to switching of the operation state of the controller 62 will be described with reference to FIG. 9.

Figure 9:
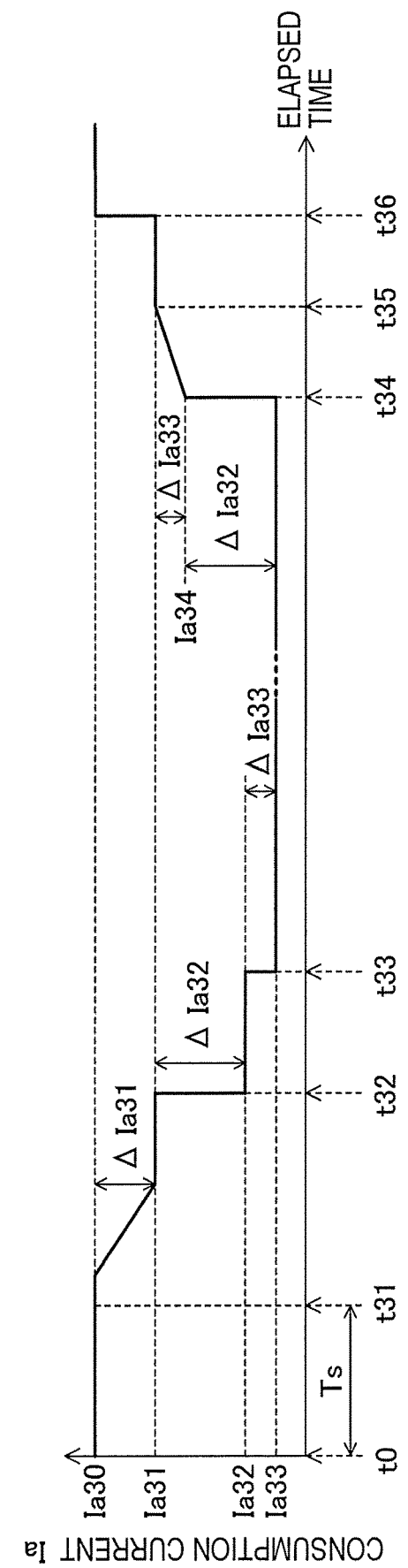
FIG. 9 is a timing chart showing a relationship between switching of operation state of the controller and consumption current in a fourth control power source, in the fourth embodiment.

FIG. 9 shows switching of the operation state of the controller 62 and change in consumption current due to elapse of time with time t0 as time when the user has ended the pulling operation of the trigger manipulator 9.

During a period from time t0 to time t31 when the sleep determination time Ts has elapsed, when a state continues in which the user does not perform the pulling operation of the trigger manipulator 9, the controller 62 starts a process to transition the operation state (operation state switching process) from the control operation state to the low power operation state.

The controller 62, when starting the operation state switching process, first executes a process to sequentially stop power supply to various devices and various circuits provided in the fourth electric working machine 25. Along with this, the consumption current Ia gradually decreases from a thirtieth consumption current Ia30 (time t31 to t32), and electric current equivalent to the current consumption (first current variation ΔIa31) in various devices before stopping is reduced. The consumption current Ia at this time decreases to a thirty-first consumption current Ia31.

The controller 62 then executes a process to transition the controller 62 itself to the low power operation state (sleep mode), as one step of the operation state switching process (time t32). As a result, electric current equivalent to current consumption (second current variation ΔIa32) corresponding to a difference between current consumption in the control operation state and current consumption in the low power operation state of the controller 62 is reduced, and the consumption current Ia at this time decreases to a thirty-second consumption current Ia32.

Thereafter, when the second bypass current determiner 131 determines that the operation state of the controller 62 is the low power operation state due to decrease in current consumption of the controller 62, the conduction command signal Sc1 indicating the low power operation state is outputted from the operation state determiner 75 to the first switcher 67, and voltage conversion by the third converter 93 is stopped. As a result, electric current equivalent to current consumption (third current variation ΔIa33) required for voltage conversion in the third converter 93 is reduced, and the consumption current Ia at this time decreases to a thirty-third consumption current Ia33.

By executing these steps, the controller 62 completes the operation state switching process, and maintains the low power operation state until the user performs the pulling operation of the trigger manipulator 9.

Thereafter, when the user performs the pulling operation of the trigger manipulator 9 (time t34), the trigger signal Str is inputted to the controller 62. As a result, the controller 62 itself transitions to the control operation state (wakes up) from the low power operation state (sleep mode). The controller 62 that has waken up starts the operation state switching process to transition the operation state from the low power operation state to the control operation state. Also, when the trigger signal Str from the trigger manipulator 9 is inputted also to the operation state determiner 75, and the conduction command signal Sc1 from the operation state determiner 75 is inputted to the fourth control power source 121, voltage conversion by the third converter 93 is started. Accordingly, along with wake-up of the controller 62 and the voltage conversion operation by the third converter 93, the consumption current Ia gradually increases to the thirty-first consumption current Ia31 (time t34 to t35). The consumption current Ia is increased by the second current variation ΔIa32 from the thirty-third consumption current Ia33 by wake-up of the controller 62 and becomes a thirty-fourth consumption current Ia34 (time t34). Thereafter, the consumption current Ia is increased by the third current variation ΔIa33 by the voltage conversion operation of the third converter 93 and becomes the thirty-first consumption current Ia31 (time t35).

At this time, when the second bypass current determiner 131 determines that the operation state of the controller 62 is the control operation state due to increase in current consumption in the controller 62, the conduction command signal Sc1 indicating the control operation state is outputted from the operation state determiner 75 to the first switcher 67. At this time, voltage conversion by the third converter 93 is already executed based on the trigger signal Str from the trigger manipulator 9. However, even if manipulation of the trigger manipulator 9 by the user is ended, the control operation state of the controller 62 is maintained and voltage conversion by the third converter 93 continues until the sleep determination time Ts elapses.

The controller 62 then executes a process to sequentially start power supply to various devices and various circuits provided in the fourth electric working machine 25, as one step in the operation state switching process (time t36). Along with this, the consumption current Ia increases to a thirtieth consumption current Ia30.

As above, the fourth electric working machine 25, when the operation state of the controller 62 is transitioned to the low power operation state, stops voltage conversion in the third converter 93 based on the determination result by the second bypass current determiner 131, thereby reducing the consumption current Ia equivalent to the third current variation ΔIa33.

[4-3. Effect]

As described above, in the fourth electric working machine 25 of the fourth embodiment, in case that the controller 62 is in the low power operation state, the fourth control power source 121, based on determination result in the second bypass current determiner 131, transitions to the second conversion state, and the third converter 93 is not used for voltage conversion in the fourth control power source 121. Thus, power consumption in the third converter 93 can be suppressed. As a result, in case that the operation state of the controller 62 is transitioned from the control operation state to the low power operation state when the fourth electric working machine 25 is not used, not only power consumption in the controller 62 but also power consumption in the third converter 93 can be reduced. Thus, power consumption when the fourth electric working machine 25 is not used can be reduced.

[4-4. Correspondence Between Terms]

The fourth electric working machine 25 corresponds to one example of the electric working machine, and the operation state determiner 75 and the second bypass current determiner 131 correspond to one example of the operation state determiner.

5. Fifth Embodiment

As the fifth embodiment, a fifth electric working machine 27 configured by replacing some components of the second electric working machine 21 in the second embodiment will be described.

Figure 10:
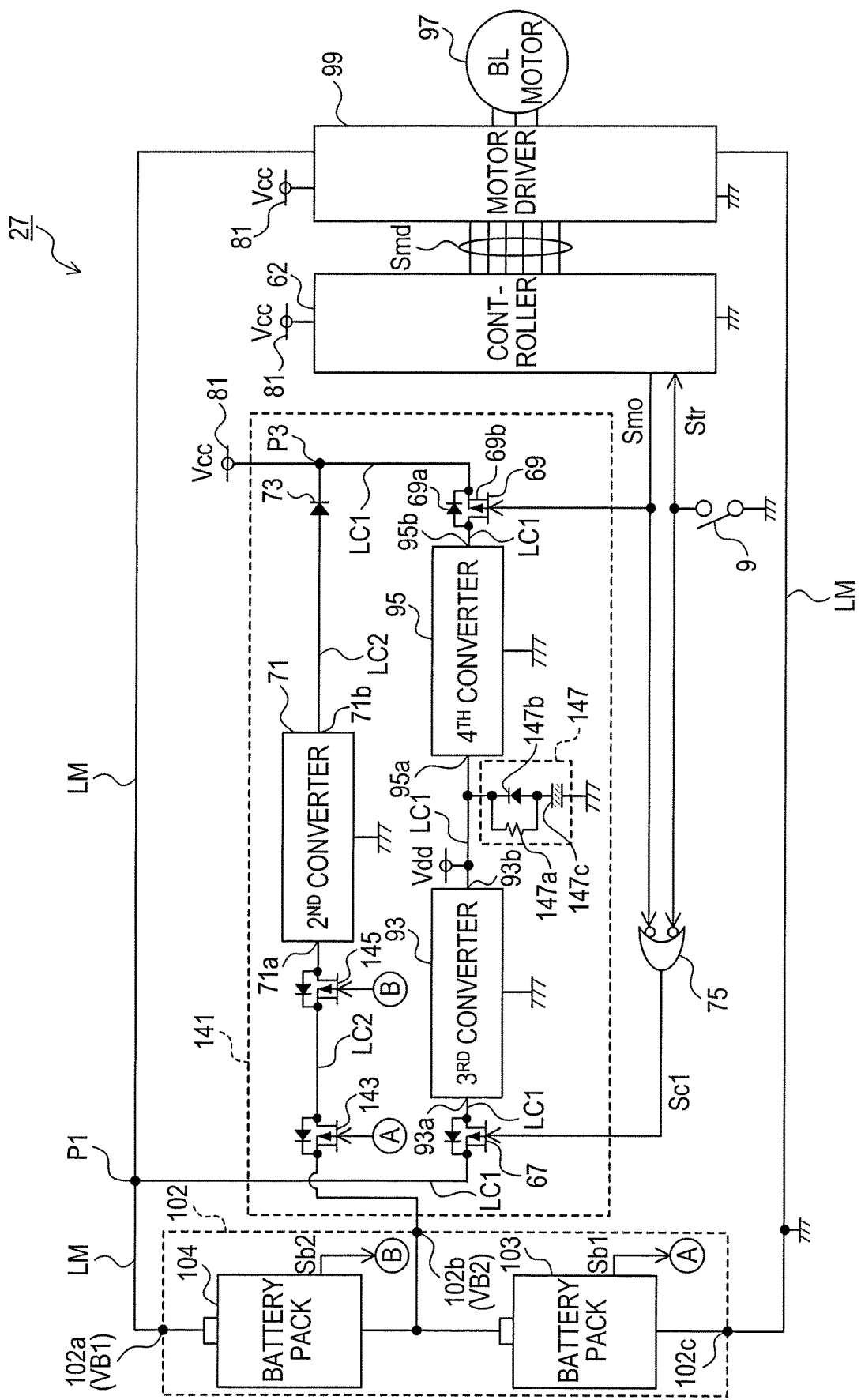
FIG. 10 is a block diagram showing an electrical configuration of the electric working machine in a fifth embodiment.

As shown in FIG. 10, the fifth electric working machine 27 includes a fifth control power source 141 and a multiple-output power source 102 in place of the second control power source 91 and the battery pack 100 of the second electric working machine 21, respectively.

The multiple-output power source 102 includes battery packs (first battery pack 103 and second battery pack 104), voltage outputters (first voltage outputter 102a and second voltage outputter 102b), and a reference voltage 102c.

The first battery pack 103 and the second battery pack 104 are coupled in series. Each of the first battery pack 103 and the second battery pack 104 includes a rechargeable battery (not shown) that can be repeatedly charged and discharged. The first battery pack 103 has an output voltage of 36 [V]. The second battery pack 104 has an output voltage of 36 [V].

The first voltage outputter 102a is coupled to a positive electrode of the second battery pack 104. The second voltage outputter 102b is coupled to a positive electrode of the first battery pack 103 and a negative electrode of the second battery pack 104. The reference voltage 102c is coupled to a negative electrode of the first battery pack 103.

The multiple-output power source 102 is configured such that each of the voltage outputters (first voltage outputter 102a and second voltage outputter 102b) outputs a different voltage based on the reference voltage 102c. The multiple-output power source 102 outputs a first battery voltage VB1 (VB1=72 [V]) from the first voltage outputter 102a, and outputs a second battery voltage VB2 (VB2=36 [V]) from the second voltage outputter 102b.

The first battery pack 103 outputs a first interruption command signal Sb1 in case of a faulty state such as dropped output voltage. The second battery pack 104 outputs a second interruption command signal Sb2 in case of a faulty state such as dropped output voltage.

[5-1. Fifth Control Power Source]

The fifth control power source 141 converts the first battery voltage VB1 or the second battery voltage VB2 to the constant voltage Vcc, and outputs the constant voltage Vcc (Vcc=5 [V]) to the constant voltage supply line 81.

The fifth control power source 141 is configured by the second control power source 91 to which the second switcher 143 and the third switcher 145 are added, and in which a coupling destination of the second current path LC2 is changed. The following description mainly describes a difference between the second control power source 91 and the fifth control power source 141.

A first end of the second current path LC2 is coupled to the second voltage outputter 102b of the multiple-output power source 102. A second end of the second current path LC2 is coupled to the third junction P3 and the constant voltage supply line 81.

The second switcher 143 and the third switcher 145 are provided in the second current path LC2 between the input device 71a of the second converter 71 and the second voltage outputter 102b of the multiple-output power source 102. Each of the second switcher 143 and the third switcher 145 is provided with a switcher (such as a FET) coupled in series to the second current path LC2.

The second switcher 143 is configured to switch the switcher to a conduction state (ON state) or a non-conduction state (OFF state) based on the first interruption command signal Sb1 from the first battery pack 103. The third switcher 145 is configured to switch the switcher to a conduction state (ON state) or a non-conduction state (OFF state) based on the second interruption command signal Sb2 from the second battery pack 104.

The second switcher 143 and the third switcher 145 are configured to switch electric conduction in the second current path LC2 from the second voltage outputter 102b to the second converter 71 to a conduction state or a non-conduction state. This allows the second switcher 143 and the third switcher 145 to switch an input state of the second battery voltage VB2 to the second converter 71 based on the first interruption command signal Sb1 and the second interruption command signal Sb2.

The third converter 93 is provided with a DC-DC converter that converts direct voltage and outputs a converted voltage. The third converter 93 converts the first battery voltage VB1 (VB1=72 [V]) inputted to the input device 93a to the second constant voltage Vdd, and outputs the second constant voltage Vdd through the outputter 93b. The third converter 93 outputs 15 [V] as the second constant voltage Vdd. The third converter 93 has a maximum output current of 150 mA for voltage conversion.

The fifth control power source 141 configured as above, when receiving the conduction command signal Sc1 indicating the control operation state from the operation state determiner 75, outputs the constant voltage Vcc using the third converter 93 and the fourth converter 95, and outputs the constant voltage Vcc using the second converter 71, thereby transitioning to a state to supply control power to the controller 62 (hereinafter, first conversion state).

Also, the fifth control power source 141, when receiving the conduction command signal Sc1 indicating the low power operation state from the operation state determiner 75, stops voltage conversion by the third converter 93 and the fourth converter 95, and outputs the constant voltage Vcc using the second converter 71, thereby transitioning to a state to supply control power to the controller 62 (hereinafter, second conversion state).

Further, the fifth control power source 141 sets the second switcher 143 or the third switcher 145 to a non-conduction state based on the first interruption command signal Sb1 from the first battery pack 103 or the second interruption command signal Sb2 from the second battery pack 104, thereby stopping input of the second battery voltage VB2 to the second converter 71. In other words, when at least one of the first battery pack 103 and the second battery pack 104 is in a faulty state, the fifth control power source 141 is configured to stop input of the second battery voltage VB2 to the second converter 71, thereby stopping output of the constant voltage Vcc by the second converter 71.

Also, the fifth control power source 141 may include a power holding circuit 147. The power holding circuit 147 is coupled to the first current path LC1 between the third converter 93 and the fourth converter 95. The power holding circuit 147 includes a resistor 147a, a diode 147b, and a capacitor 147c.

The power holding circuit 147 is configured to charge the capacitor 147c via the resistor 147a, and discharge the capacitor 147c via the diode 147b. This allows the power holding circuit 147 to quickly discharge the capacitor 147c while suppressing the second constant voltage Vdd due to inrush-current at the start of charging the capacitor 147c.

With the power holding circuit 147, the second constant voltage Vdd and the constant voltage Vcc can be maintained by an electrical charge charged to the capacitor 147c of the power holding circuit 147 during a certain period after the third converter 93 stops output of the second constant voltage Vdd, and the controller 62 can be driven. Therefore, even if the multiple-output power source 102 is suddenly removed or output (power source) from the multiple-output power source 102 is lost due to some failure, the second constant voltage Vdd and the constant voltage Vcc are maintained by discharge of the capacitor 147c. Therefore, the controller 62 can appropriately practice a shutdown process. The shutdown process includes, for example, a process of writing various history information and various setting states to a non-volatile memory.

[5-2. Effect]

As described above, in the fifth electric working machine 27 of the fifth embodiment, in case that the controller 62 is in the low power operation state, the fifth control power source 141 transitions to the second conversion state, and the third converter 93 and the fourth converter 95 are not used for voltage conversion in the fifth control power source 141. Thus, power consumption in the third converter 93 and the fourth converter 95 can be suppressed. As a result, in case that the operation state of the controller 62 is transitioned from the control operation state to the low power operation state when the fifth electric working machine 27 is not used, not only power consumption in the controller 62 but also power consumption in the third converter 93 and the fourth converter 95 can be reduced. Thus, power consumption when the fifth electric working machine 27 is not used can be reduced.

Also, the fifth electric working machine 27 uses the multiple-output power source 102 having multiple battery packs as the power source. Thus, as compared to a configuration using one battery pack, increased output operation based on increased voltage is possible. The multiple-output power source 102 can increase a maximum voltage that can be outputted in accordance with the number of battery packs by employing a configuration with multiple battery packs.

In the fifth electric working machine 27, the second converter 71 is coupled not to the first voltage outputter 102*a* having the largest output voltage but coupled to the second voltage outputter 102*b* having the smallest output voltage. In other words, the second converter 71 is configured not to convert the first battery voltage VB1 (VB1=72 [V]) to the constant voltage Vcc (Vcc=5 [V]) but configured to convert the second battery voltage VB2 (VB1=36 [V]) to the constant voltage Vcc.

This allows the second converter 71 to reduce voltage change in voltage conversion in the second converter 71 as compared to a case of voltage conversion from the first battery voltage VB1 to the constant voltage Vcc. Therefore, the fifth electric working machine 27 can reduce power loss due to voltage conversion in the second converter 71 as compared to a case of large voltage change.

In the fifth electric working machine 27, "the third converter 93 and the fourth converter 95" (corresponding to one example of the first converter) are coupled to the first voltage outputter 102*a* having a larger output voltage (VB1=72 [V]) than the second voltage outputter 102*b* having the output voltage (VB2=36 [V]) to which the second converter 71 is coupled. As a result, electric energy that can be outputted from "the third converter 93 and the fourth converter 95" is larger than electric energy that can be outputted from the second converter 71. "The third converter 93 and the fourth converter 95" can supply sufficient electric power to the controller 62 as compared to the second converter 71.

[5-3. Correspondence Between Terms]

The multiple-output power source 102 corresponds to one example of the power source, and the third converter 93 and the fourth converter 95 correspond to one example of the first converter.

6. Sixth Embodiment

As the sixth embodiment, a sixth electric working machine 29 configured by replacing some components of the third electric working machine 23 in the third embodiment will be described.

Figure 11:
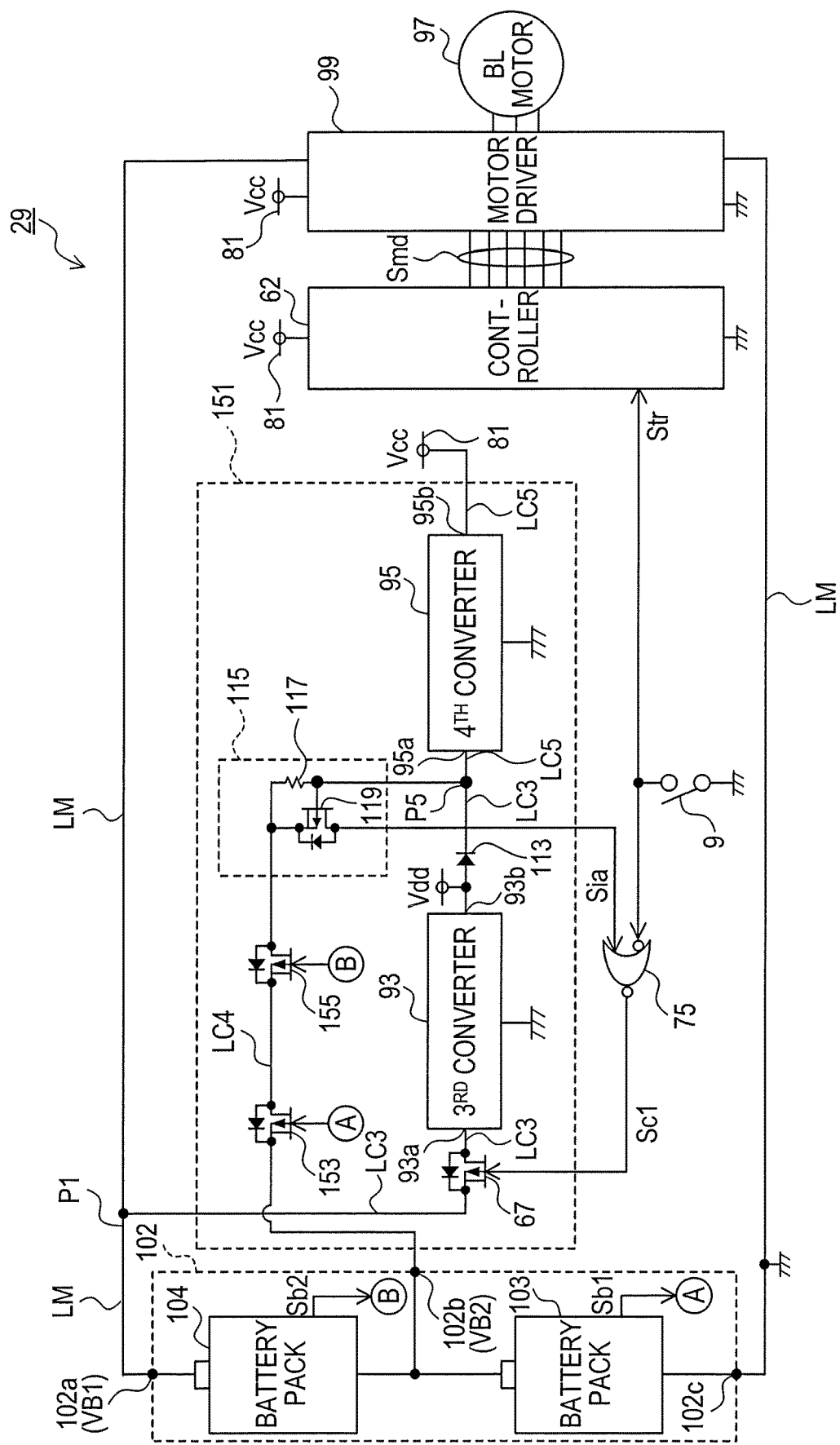
FIG. 11 is a block diagram showing an electrical configuration of the electric working machine in a sixth embodiment.

As shown in FIG. 11, the sixth electric working machine 29 includes a-sixth control power source 151 and the multiple-output power source 102 in place of the third control power source 111 and the battery pack 100 of the third electric working machine 23, respectively.

The multiple-output power source 102 in the sixth embodiment has the same configuration as that of the fifth embodiment, and thus will not be further described.

[6-1. Sixth Control Power Source]

The sixth control power source 151 converts the first battery voltage VB1 or the second battery voltage VB2 to the constant voltage Vcc, and outputs the constant voltage Vcc (Vcc=5 [V]) to the constant voltage supply line 81.

The sixth control power source 151 is configured by the third control power source 111 to which a fourth switcher 153 and a fifth switcher 155 are added, and in which a coupling destination of the bypass current path LC4 is changed. The following description mainly describes a difference between the third control power source 111 and the sixth control power source 151.

The first end of the bypass current path LC4 is coupled to the second voltage outputter 102*b* of the multiple-output power source 102. The second end of the bypass current path LC4 is coupled to the fifth junction P5 and the first end of the common current path LC5.

The fourth switcher 153 and the fifth switcher 155 are provided in the bypass current path LC4 between the bypass current determiner 115 and the second voltage outputter 102*b* of the multiple-output power source 102. Each of the fourth switcher 153 and the fifth switcher 155 includes a switcher (such as a FET) coupled in series to the bypass current path LC4.

The fourth switcher 153 is configured to switch the switcher to a conduction state (ON state) or a non-conduction state (OFF state) based on the first interruption command signal Sb1 from the first battery pack 103. The fifth switcher 155 is configured to switch the switcher to a conduction state (ON state) or a non-conduction state (OFF state) based on the second interruption command signal Sb2 from the second battery pack 104.

The fourth switcher 153 and the fifth switcher 155 are configured to switch electric conduction in the bypass current path LC4 from the second voltage outputter 102*b* to the fourth converter 95 via the bypass current determiner 115 to a conduction state or a non-conduction state. This allows the fourth switcher 153 and the fifth switcher 155 to switch an input state of the second battery voltage VB2 to the fourth converter 95 via the bypass current determiner 115 based on the first interruption command signal Sb1 and the second interruption command signal Sb2.

The third converter 93 is provided with a DC-DC converter that converts direct voltage and outputs a converted voltage. The third converter 93 converts the first battery voltage VB1 (VB1=72 [V]) inputted to the input device 93*a* to the second constant voltage Vdd, and outputs the second constant voltage Vdd through the outputter 93*b*. The third converter 93 outputs 15 [V] as the second constant voltage Vdd. The third converter 93 has a maximum output current of 150 mA for voltage conversion.

In the sixth control power source 151 configured as above, when the first current notification signal Sia1 is outputted from the current determiner 119 to the operation state determiner 75, the conduction command signal Sc1 indicating the control operation state is outputted from the operation state determiner 75 to the first switcher 67, and voltage conversion by the third converter 93 is executed. At this time, the sixth control power source 151 converts the first battery voltage VB1 to the constant voltage Vcc using the third converter 93 and the fourth converter 95 and outputs the constant voltage Vcc, thereby transitioning to a state to supply control power to the controller 62 (hereinafter, first conversion state).

Also, in the sixth control power source 151, when the second current notification signal Sia2 is outputted from the current determiner 119 to the operation state determiner 75, the conduction command signal Sc1 indicating the low power operation state is outputted from the operation state determiner 75 to the first switcher 67, and voltage conversion by the third converter 93 is stopped. At this time, the sixth control power source 151 converts the second battery voltage VB2 to the constant voltage Vcc using the fourth converter 95 and outputs the constant voltage Vcc, thereby transitioning to a state to supply control power to the controller 62 (hereinafter, second conversion state).

Further, the sixth control power source 151 sets the fourth switcher 153 or the fifth switcher 155 to a non-conduction state based on the first interruption command signal Sb1 from the first battery pack 103 or the second interruption command signal Sb2 from the second battery pack 104, thereby stopping input of the second battery voltage VB2 to the fourth converter 95 via the bypass current path LC4. In other words, when at least one of the first battery pack 103 and the second battery pack 104 is in faulty state, the sixth control power source 151 is configured to stop input of the second battery voltage VB2 to the fourth converter 95 via the bypass current path LC4, thereby stopping output of the constant voltage Vcc by the fourth converter 95 via the bypass current path LC4.

[6-2. Effect]

As described above, in the sixth electric working machine 29 of the sixth embodiment, in case that the controller 62 is in the low power operation state, the sixth control power source 151 transitions to the second conversion state, and the third converter 93 is not used for voltage conversion in the sixth control power source 151. Thus, power consumption in the third converter 93 can be suppressed. As a result, in case that the operation state of the controller 62 is transitioned from the control operation state to the low power operation state when the sixth electric working machine 29 is not used, not only power consumption in the controller 62 but also power consumption in the third converter 93 can be reduced. Thus, power consumption when the sixth electric working machine 29 is not used can be reduced.

Also, the sixth electric working machine 29 uses the multiple-output power source 102 having multiple battery packs as the power source. Thus, as compared to a configuration using one battery pack, increased output operation based on increased voltage is possible.

In the sixth electric working machine 29, the fourth converter 95 is coupled not to the to the first voltage outputter 102a having the largest output voltage but coupled to the second voltage outputter 102b having the smallest output voltage. In other words, the fourth converter 95 is configured not to convert the first battery voltage VB1 (VB1=72 [V]) to the constant voltage Vcc (Vcc=5 [V]) but configured to convert the second battery voltage VB2 (VB1=36 [V]) to the constant voltage Vcc.

This allows the fourth converter 95 to reduce voltage change in voltage conversion in the fourth converter 95 as compared to a case of voltage conversion from the first battery voltage VB1 to the constant voltage Vcc. Therefore, the sixth electric working machine 29 can reduce power loss due to voltage conversion in the fourth converter 95 as compared to a case of large voltage change.

In the sixth electric working machine 29, "the third converter 93 and the fourth converter 95" (corresponding to one example of the first converter) are coupled to the first voltage outputter 102a having a larger output voltage (VB1=72 [V]) than the second voltage outputter 102b having the output voltage (VB2=36 [V]) to which the fourth converter 95 (corresponding to one example of the second converter) is coupled. As a result, electric energy that can be outputted from "the third converter 93 and the fourth converter 95" is larger than electric energy that can be outputted when the fourth converter 95 is used alone. "The third converter 93 and the fourth converter 95" can supply sufficient electric power to the controller 62 as compared to the case in which the fourth converter 95 is used alone.

[6-3. Correspondence Between Terms]

The multiple-output power source 102 corresponds to one example of the power source, "the third converter 93 and the fourth converter 95" correspond to one example the first converter, and the fourth converter 95 alone corresponds to one example of the second converter.

7. Other Embodiments

The embodiments of present disclosure have been described in the above. The present disclosure is not limited to the aforementioned embodiments and can be practiced in various forms without departing from the gist of the present disclosure.

(a) In the aforementioned third embodiment and fourth embodiment, the state notification signal Smo outputted from the controller 62 is not used. However, as in the first embodiment and the second embodiment, the state notification signal Smo may be used. For example, in the third electric working machine 23 of the third embodiment, the state notification signal Smo (first state notification signal Smo1 and second state notification signal Smo2), in addition to the current notification signal Sia outputted from the bypass current determiner 115, may be inputted to the operation state determiner 75. In other words, the operation state determiner 75 may be configured to receive the first state notification signal Smo1 and the second state notification signal Smo2.

This operation state determiner 75 determines that the operation state of the controller 62 is the control operation state when the bypass current Ibp is larger than the operation reference value Ith or when the first state notification signal Smo1 is received. This operation state determiner 75 determines that the operation state of the controller 62 is the low power operation state when the bypass current Ibp is equal to or smaller than the operation reference value Ith and the second state notification signal Smo2 is received.

In this electric working machine, the operation state determiner 75 can determine the operation state of the controller 62 based on the first state notification signal Smo1 and the second state notification signal Smo2, in addition to the result of comparison between the bypass current Ibp and the operation reference value Ith.

In the fourth electric working machine 25 of the fourth embodiment as well, the state notification signal Smo (first state notification signal Smo1 and second state notification signal Smo2), in addition to the current notification signal Sia outputted from the second bypass current determiner 131, may be inputted to the operation state determiner 75.

Also, the operation determination process executed in the operation state determiner 75 may be replaced with an operation determination process as an internal process of the controller 62. For example, the controller 62 may generate the conduction command signal Sc1 using the trigger signal Str and the state notification signal Smo and output the conduction command signal Sc1 to the first switcher 67, thereby controlling the first switcher 67. Alternatively the controller 62 may be configured to receive the current notification signal Sia, generate the conduction command signal Sc1 using the trigger signal Str and the current notification signal Sia and output the conduction command signal Sc1 to the first switcher 67, thereby controlling the first switcher 67.

(b) The first reverse flow suppressor 69 is not limited to the configuration provided with a switcher such as a FET. Any configuration such as a schottky diode can be employed as long as it can suppress inflow of reverse current, and has low voltage drop when electric current flows in forward direction. The same applies to the second reverse flow suppressor 73.

(c) In the aforementioned embodiments, the constant voltage Vcc=5 [V], the battery voltage VB=36 [V], and the second constant voltage Vdd=15 [V]. These voltages are not limited to the above values, and may be other appropriate values depending on usage of the electric working machine.

Figure 12:
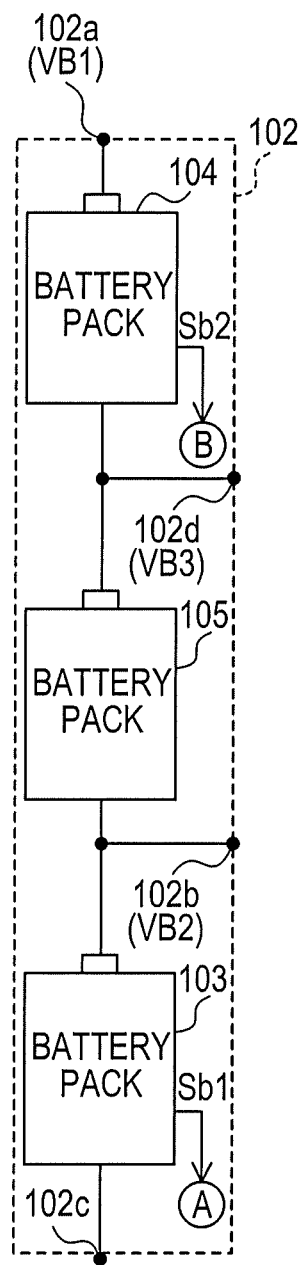
FIG. 12 is a block diagram showing an electrical configuration of a multiple-output power source including three voltage outputters.

As shown in FIG. 12, the multiple-output power source 102 may include three battery packs (first battery pack 103, second battery pack 104, and third battery pack 105), three voltage outputters (first voltage outputter 102a, second voltage outputter 102b, and third voltage outputter 102d), and a reference voltage 102c. The multiple-output power source 102 may output a first battery voltage VB1 (VB1=108 [V]) from the first voltage outputter 102a, output a third battery voltage VB3 (VB3=72 [V]) from the third voltage outputter 102d, and output the second battery voltage VB2 (VB2=36 [V]) from the second voltage outputter 102b.

In the aforementioned embodiments, only the converter that steps down the voltage is provided. The electric working machine of the present disclosure may be provided with a converter that steps up the voltage. For example, in the second embodiment, the third converter 93 steps down the battery voltage VB to the second constant voltage Vdd. As another form, after the third converter 93 steps up the battery voltage VB (36 [V]) to a third constant voltage Vee (for example, 51 [V]), a fifth converter (not shown) may step down the third constant voltage Vee to the second constant voltage Vdd (15 [V]). The third constant voltage Vee has higher voltage than the battery voltage VB, and can be used as a power source of a high side FET. Also, presence of the converter that steps up the voltage allows generation of the second constant voltage Vdd, even if the battery voltage VB falls below the second constant voltage Vdd (15 [V]) due to failure of the battery pack 100, for example.

(d) The electric working machine to which the present disclosure is applicable is not limited to a rechargeable impact driver, and may be, for example, an electric hammer, an electric hammer drill, an electric drill, an electric driver, an electric wrench, an electric reciprocating saw, an electric jigsaw, an electric cutter, an electric chainsaw, and electric planer, an electric tacker, an electric nailer, an electric hedge trimmer, an electric lawn mower, an electric grass trimmer, an electric grass cutter, an electric cleaner, an electric blower, an electric grinder, an electric impact driver, an electric circular saw, an electric hammer driver, etc.

(e) Functions of one component in the aforementioned embodiments may be distributed as two or more components, and functions of two or more components may be integrated as one component. At least a part of the configuration of the aforementioned embodiments may be replaced with known configurations having the same function. A part of the aforementioned embodiments may be omitted. At least a part of the configuration of the aforementioned embodiment may be added to or may replace the configuration of the other embodiment. It should be noted that any and all modes that are encompassed in the technical ideas defined by the languages in the scope of the claims are embodiments of the present disclosure.

What is claimed is:

1. An electric working machine comprising:
   a first battery pack including a first positive electrode and a first negative electrode, the first battery pack having a first pack voltage;
   a first battery port configured to be detachably attached to the first battery pack;
   a second battery pack including a second positive electrode and a second negative electrode, the second battery pack having a second pack voltage;
   a second battery port configured to be detachably attached to the second battery pack, the second battery port being coupled to the first battery port so as to electrically couple the second negative electrode to the first positive electrode;
   a first voltage outputter electrically coupled to the second battery port, the first voltage outputter being configured to output a voltage sum, the voltage sum corresponding to a sum of the first pack voltage and the second pack voltage;
   a second voltage outputter electrically coupled to the first battery port, the second voltage outputter being configured to output the first pack voltage;
   a motor configured to be driven upon receipt of the voltage sum;
   a trigger configured to be turned ON or OFF by a user of the electric working machine;
   a controller configured to (i) switch to a control operation state in response to the trigger being turned ON, and (ii) switch to a low power operation state in response to the trigger being turned OFF, the controller in the control operation state being configured to control the motor, and the controller in the low power operation state being configured to consume electric power smaller than electric power consumed in the controller in the control operation state; and
   a control power source including:
      a first current path included in a current path from the first battery port and the second battery port to the controller;
      a second current path coupled in parallel to the first current path;
      a first converter provided on the first current path, the first converter being configured to output a first control current upon receipt of the voltage sum, the first control current having a first maximum value, and the first maximum value corresponding to a maximum value of consumed current in the controller in the control operation state; and
      a second converter provided on the second current path, the second converter being configured to output a second control current upon receipt of the first pack voltage, the second control current having a second maximum value, and the second maximum value (i) being smaller than the first maximum value and (ii) corresponding to a maximum value of consumed current in the controller in the low power operation state,
      the control power source being configured to switch to a first conversion state or to a second conversion state, the control power source in the first conversion state being configured to supply the first control current to the controller via the first converter, and the control power source in the second conversion state being configured to supply the second control current to the controller via the second converter.

2. An electric working machine comprising:
a driving device configured to be driven with power-supply power outputted from a power source, the power source including a first voltage outputter and a second voltage outputter, the first voltage outputter being configured to output a first output voltage, the second voltage outputter being configured to output a second output voltage, and the first output voltage being higher than the second output voltage;
a controller configured to selectively switch to a control operation state or a low power operation state, the controller in the control operation state being configured to control the driving device, and the controller in the low power operation state being configured to consume electric power smaller than electric power consumed in the controller in the control operation state; and
a control power source including:
a first converter coupled to the first voltage outputter, the first converter being configured to output a first control current based on the power-supply power, the first control current having a first maximum value, and the first maximum value corresponding to a maximum value of consumed current in the controller in the control operation state; and
a second converter coupled to the second voltage outputter, the second converter being configured to output a second control current based on the power-supply power, the second control current having a second maximum value, and the second maximum value (i) being smaller than the first maximum value and (ii) corresponding to a maximum value of consumed current in the controller in the low power operation state,
the control power source being configured to switch to either a first conversion state or a second conversion state, the control power source in the first conversion state being configured to supply the first control current to the controller via the first converter, and the control power source in the second conversion state being configured to supply the second control current to the controller via the second converter.

3. The electric working machine according to claim 2, wherein
the control power source further includes:
a first power supply switcher configured to (i) switch to a first supply permission state in response to the control power source being in the first conversion state, and (ii) switch to a first supply stop state in response to the control power source being in the second conversion state, the first supply permission state corresponding to a state where the first power supply switcher permits supply of the power-supply power to the first converter, and the first supply stop state corresponding to a state where the first power supply switcher stops supply of the power-supply power to the first converter; and
a second power supply switcher configured to (i) switch to a second supply stop state in response to the control power source being in the first conversion state, and (ii) switch to a second supply permission state in response to the control power source being in the second conversion state, the second supply permission state corresponding to a state where the second power supply switcher permits supply of the power-supply power to the second converter, and the second supply stop state corresponding to a state where the second power supply switcher stops supply of the power-supply power to the second converter.

4. The electric working machine according to claim 3, wherein
the control power source further includes:
a first current path included in a current path from the power source to the controller; and
a second current path coupled in parallel to the first current path, and the second power supply switcher includes:
a first switcher provided on the second current path, the first switcher being configured to complete or break the second current path; and
a second switcher provided on the second current path, the second switcher being coupled in series to the first switcher, and the second switcher being configured to complete or break the second current path.

5. The electric working machine according to claim 3, wherein
the second power supply switcher is configured to receive a failure notification signal, and
the second power supply switcher is further configured to switch to the second supply stop state in response to the second power supply switcher receiving or having received the failure notification signal, the failure notification signal notifying that the power source is in a faulty state.

6. The electric working machine according to claim 5, wherein
the power source is configured to output the failure notification signal.

7. The electric working machine according to claim 3, wherein the control power source includes:
a first current path included in a current path from the power source to the controller; and
a second current path coupled in parallel to the first current path,
the first converter is provided on the first current path,
the second converter is provided on the second current path,
the control power source in the first conversion state is configured to supply the first control current to the controller via the first current path, and
the control power source in the second conversion state is configured to supply the second control current to the controller via the second current path.

8. The electric working machine according to claim 7, wherein
the second power supply switcher includes first and second switches provided on the second current path and coupled in series to each other, the first and second switches being configured to complete or break the second current path.

9. The electric working machine according to claim 7, wherein the second converter includes a second outputter, and
the electric working machine further includes a second reverse flow suppressor provided between the second converter and the controller on the second current path, the second reverse flow suppressor (i) being coupled to the second outputter and (ii) being configured to suppress inflow of reverse current to the second outputter.

10. The electric working machine according to claim 7, wherein the power-supply power has a power-supply voltage,
the first converter is configured to output a first control voltage based on the power-supply voltage, the first control voltage being lower than the power-supply voltage, and
the second converter is configured to output a second control voltage based on the power-supply voltage, the second control voltage being approximately equal to the first control voltage.

11. The electric working machine according to claim 7, further comprising:
an operation state determiner configured to receive a first state notification signal and a second state notification signal, the first state notification signal indicating that the operation state of the controller is the control operation state, the second state notification signal indicating that the operation state of the controller is the low power operation state, the operation state determiner being configured to determine that the operation state of the controller is the control operation state in response to the operation state determiner receiving or having received the first state notification signal, and the operation state determiner being configured to determine that the operation state of the controller is the low power operation state in response to the operation state determiner receiving or having received the second state notification signal.

12. The electric working machine according to claim 2, wherein
the power source further includes a first battery pack and a second battery pack,
the first output voltage corresponds to a sum of (i) an output voltage of the first battery pack and (ii) an output voltage of the second battery pack, and
the second output voltage corresponds to an output voltage of the first battery pack.

13. The electric working machine according to claim 2, wherein
the power source further includes a third voltage outputter configured to output a third output voltage, and
the second output voltage is lower than the third output voltage.

14. The electric working machine according to claim 2, wherein
the control power source is configured to transition to the first conversion state in response to a user of the electric working machine manipulating the electric working machine.

15. The electric working machine according to claim 2, wherein
the first converter includes a first outputter, and
the electric working machine includes a first reverse flow suppressor connected to the first outputter, the first reverse flow suppressor being configured to suppress inflow of reverse current to the first outputter.

16. The electric working machine according to claim 2, wherein the control power source further includes:
a third current path included in a current path from the power source to the controller;
a bypass current path coupled in parallel to the third current path; and
a common current path coupled to the third current path and to the bypass current path,
the first converter is provided on the third current path,
the second converter is provided on the common current path,
the power-supply power has a power-supply voltage,
the first converter is configured to convert the power-supply voltage to a first control voltage,
the first control voltage is lower than the power-supply voltage,
the second converter is configured to convert the power-supply voltage or the first control voltage into a second control voltage,
the second control voltage is lower than the first control voltage,
the control power source in the first conversion state is configured to (i) operate the first converter and the second converter so that the second converter converts the first control voltage into the second control voltage, and (ii) supply the second control voltage to the controller, and
the control power source in the second conversion state is configured to operate the second converter so that the second converter converts the power-supply voltage into the second control voltage.

17. The electric working machine according to claim 16, wherein
the bypass current path is configured to receive a bypass current, the bypass current corresponding to part of a current flowing from the power source to the common current path,
the electric working machine further includes:
an operation state determiner configured to determine whether a magnitude of the bypass current flowing through the bypass current path is larger than a predetermined criterion, the predetermined criterion corresponding to a determination value for determining whether the controller is in the control operation state, and the operation state determiner being configured to (i) determine that the controller is in the control operation state in response to the magnitude of the bypass current being larger than the predetermined criterion, and (ii) determine that the controller is in the low power operation state in response to the magnitude of the bypass current being equal to or smaller than the predetermined criterion.

18. The electric working machine according to claim 17, wherein
the operation state determiner is configured to receive a first state notification signal and a second state notification signal, the first state notification signal indicating that the operation state of the controller is the control operation state, and the second state notification signal indicating that the operation state of the controller is the low power operation state,
the operation state determiner is further configured to determine that the controller is in the control operation state (i) in response to the magnitude of the bypass current being larger than the predetermined criterion or (ii) in response to the operation state determiner having received the first state notification signal, and
the operation state determiner is further configured to determine that the controller is in the low power operation state in response to (i) the magnitude of the bypass current being equal to or smaller than the predetermined criterion and (ii) the operation state determiner having received the second state notification signal.

19. The electric working machine according to claim 2, wherein the control power source further includes:
a first power supply switcher configured to switch to either a supply permission state or a supply stop state, the first power supply switcher in the supply permission state being configured to supply the power-supply power to the first converter, and the first power supply switcher in the supply stop state being configured to stop supply of the power-supply power to the first converter; and
a second power supply switcher configured to switch to either the supply permission state or the supply stop state, the second power supply switcher in the supply permission state being configured to supply the power-supply power to the second converter, and the second power supply switcher in the supply stop state being configured to stop supply of the power-supply power to the second converter,
the control power source in the first conversion state is configured such that the first power supply switcher and the second power supply switcher switch so that (i) a supply state of the power-supply power to the first converter is set to the supply permission state and (ii) a supply state of the power-supply power to the second converter is set to the supply stop state, and
the control power source in the second conversion state is configured such that the first power supply switcher and the second power supply switcher switch so that (i) the supply state of the power-supply power to the first converter is set to the supply stop state and (ii) the supply state of the power-supply power to the second converter is set to the supply permission state.

20. A method for supplying electric power to a controller of an electric working machine, the method comprising:
applying a first output voltage outputted from a power source to a first converter;
supplying a first control current from the first converter to the controller based on electric power of the power source in response to the controller being in a control operation state, the first control current having a first maximum value, and the first maximum value corresponding to a maximum value of consumed current in the controller in the control operation state;
applying a second output voltage outputted from the power source to a second converter, the second output voltage being lower than the first output voltage; and
supplying a second control current from the second converter to the controller based on the electric power of the power source in response to the controller being in a low power operation state, the second control current having a second maximum value, and the second maximum value (i) being smaller than the first maximum value and (ii) corresponding to a maximum value of consumed current in the controller in the low power operation state.

* * * * *